(12) United States Patent
Luo

(10) Patent No.: US 12,713,232 B2
(45) Date of Patent: Aug. 18, 2026

(54) METHODS, DEVICES AND SYSTEMS FOR AUTHENTICATION OF DEVICES TO A WIRELESS NETWORK WITH MULTI-PART PASSPHRASES

(71) Applicant: Cypress Semiconductor Corporation, San Jose, CA (US)

(72) Inventor: Hui Luo, Marlboro, NJ (US)

(73) Assignee: Cypress Semiconductor Corporation, San Jose, CA (US)

( * ) Notice: Subject to any disclaimer, the term of this patent is extended or adjusted under 35 U.S.C. 154(b) by 384 days.

(21) Appl. No.: 18/424,506

(22) Filed: Jan. 26, 2024

(65) Prior Publication Data

US 2025/0142323 A1 May 1, 2025

Related U.S. Application Data

(60) Provisional application No. 63/593,135, filed on Oct. 25, 2023.

(51) Int. Cl.

| | |
|---|---|
| ***H04W 12/041*** | (2021.01) |
| ***H04L 9/30*** | (2006.01) |
| ***H04W 12/0431*** | (2021.01) |
| ***H04W 12/06*** | (2021.01) |
| ***H04W 12/106*** | (2021.01) |

(52) U.S. Cl.
CPC ......... *H04W 12/041* (2021.01); *H04L 9/3066* (2013.01); *H04W 12/0431* (2021.01); *H04W 12/06* (2013.01); *H04W 12/106* (2021.01)

(58) Field of Classification Search
CPC ........................ H04W 12/041; H04W 12/0431
See application file for complete search history.

(56) References Cited

U.S. PATENT DOCUMENTS

| | | | | |
|---|---|---|---|---|
| 2016/0295409 | A1* | 10/2016 | Lee | H04W 12/04 |
| 2019/0053052 | A1* | 2/2019 | Sun | H04L 63/0876 |

* cited by examiner

*Primary Examiner* — Myron Wyche

(57) ABSTRACT

A method can include, by operation of a first wireless device, storing a first passphrase comprising a common password and a specific password, transforming the common password into a first finite field (FF) element and the specific password into a second FF element. A first key can be generated using a received third scalar value and third FF element. A commit message can be transmitted with a portion encrypted with the first key. In response to receiving a fourth scalar value and a fourth FF element, generating a second key using at least the fourth scalar value and the fourth FF element, and transmitting a second wireless message with a portion encrypted with the second key. In response to validating a received confirmation message using the second key, establishing encryption keys for a wireless connection using at least the second key. Corresponding devices and systems are also disclosed.

20 Claims, 17 Drawing Sheets

METHODS, DEVICES AND SYSTEMS FOR AUTHENTICATION OF DEVICES TO A WIRELESS NETWORK WITH MULTI-PART PASSPHRASES

CLAIM OF PRIORITY

The present application claims the benefit under 35 USC 119(e) of U.S. Provisional Patent Application No. 63/593, 135 filed Oct. 25, 2023, which is incorporate by reference herein.

TECHNICAL FIELD

The present disclosure relates generally to authentication of wireless devices, and more particular to methods by which access to a password protected wireless network can be differentiated between different users under a common password.

BACKGROUND

Conventional wireless networks, such as those in compliance with WPA2/WPA3 certification, can include a Personal Mode that uses a single password for controlling access to the network. A drawback to such a security arrangement can be the vulnerability arising from the password leaking to unintended parties. Further, such security cannot provide user differentiated services.

The use of password identifiers (pw ids) has been proposed by the IEEE. Different pw ids can be mapped to a single password. The use of pw ids can enable the assignment of different network authorization policies to different stations (STAs) that access the network with the same password. However, in such systems, a pw id can be passed in clear text, giving rise to privacy concerns.

The standards promulgated by the Wi-Fi Alliance include an Enterprise Mode that can enable different user identification values (user ids) to be associated with a same password. In the Enterprise mode an Authentication, Authorization, and Accounting (AAA) certified server can encrypt a user id with a server public key using the Extensible Authentication Protocol-Transport Layer Security (EAP-TLS) or Extensible Authentication Protocol-Tunneled Transport Layer Security (EAP-TTLS). A drawback to such an approach can be the high costs involved in using and maintaining a AAA server.

The WPA3 Specification (Version 3.1) includes an extension to its Simultaneous Authentication of Equals (SAE) authentication, called SAE-PK. SAE-PK can include a pw id being encrypted. SAE-PK can require a user to verify a "fingerprint" value, generated by hashing the password, a random number and a public key. A drawback to SAE-PK can be that a fingerprint value can appear as an essentially random sequence of characters, and thus can be difficult to remember. That is, the approach may be difficult to implement with a typical user.

It would be desirable to arrive at some way of providing differentiated access to a wireless network by different users under a same password that does not suffer from the drawbacks noted above.

SUMMARY

Embodiments can include methods, devices and systems that include, by operation of a first wireless device, storing a first passphrase comprising a common password and a specific password, transforming the common password into a first finite field (FF) element and the specific password into a second FF element. A first key can be generated using a received third scalar value and third FF element. A commit message can be transmitted with a portion encrypted with the first key. In response to receiving a fourth scalar value and a fourth FF element, generating a second key using at least the fourth scalar value and the fourth FF element, and transmitting a second wireless message with a portion encrypted with the second key. In response to validating a received confirmation message using the second key, establishing encryption keys for a wireless connection using at least the second key.

DETAILED DESCRIPTION

According to embodiments, differentiated access to a wireless network can be based on a passphrase, which can include a common password and specific password. A common password can be common to multiple passphrases, while a specific password can be different for each user and/or device. A specific password, like a common password, can take any suitable form, including a sequence of alphanumeric characters that may be easy for users to remember, maintain and/or periodically update.

According to embodiments, devices can apply the common password to a same cyclic finite field (FF) function, and optionally execute other operations, to generate a common finite field (FF) element. The devices can exchange common FF elements and other values (e.g., scalars). From such exchanged values, the devices can compute a shared common key. A shared common key can be used to validate possession of the common password. If possession of a common password is validated, the same or similar operations can be used to generate a shared specific key based on a specific password.

In some embodiments, a common password can be transformed into a FF element with an elliptic curve cryptographic (ECC) function.

According to embodiments, a passphrase can also include a password identification value (pw id). A pw id can be encrypted using a common key and transmitted in a message, to thereby indicate extended password capabilities (e.g., a specific password associated with the common password).

According to embodiments, a device can transmit a message with pw id field. A non-printable character can be included in pw id field to indicate extended password capabilities.

According to embodiments, devices in an authentication operation can apply a specific password to a same cyclic FF function, and optionally execute other operations, to generate a specific FF element. The devices can exchange specific FF elements and other values. From such exchanged values, the devices can compute a shared specific key. A shared specific key can be used to validate possession of the specific password. A shared specific key can then be used as source key material to generate encryption keys for a connection. In some embodiments, a shared specific key can be source key material for a four-way handshake operation.

In some embodiments, a specific password can be transformed into a FF element with an ECC function.

In some embodiments, devices can include a station device (STA) and access point device (AP) compatible with at least one IEEE 802.11 wireless standard (referred to herein as Wi-Fi).

In some embodiments, devices that access a same wireless network with a common password can be given differentiated access to wireless network features based on a specific password associated with the common password.

Figure 1:
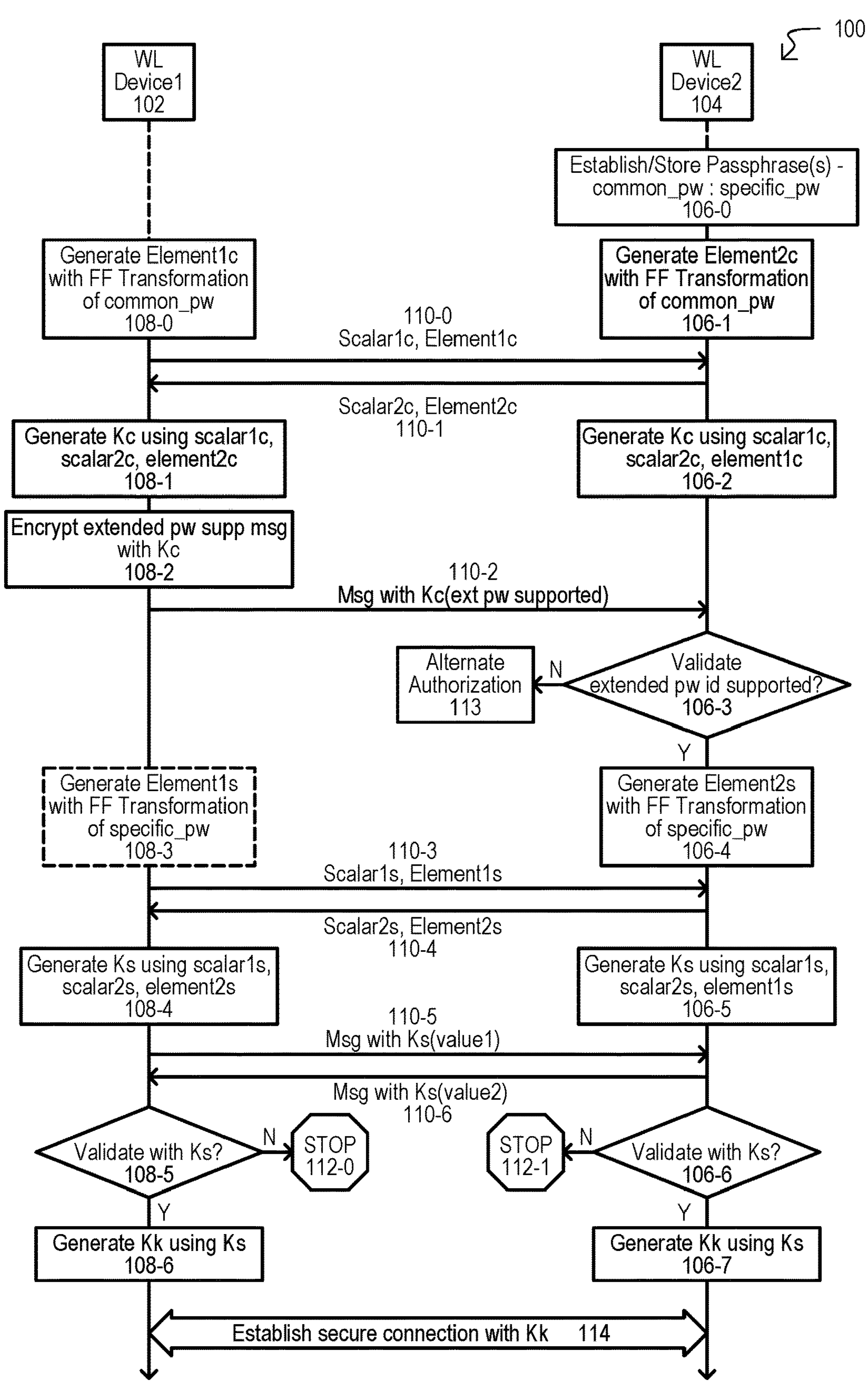
FIG. 1 is a signaling diagram showing a system and corresponding operations according to an embodiment.

FIG. 1 is a signaling diagram showing a system 100 and corresponding operations according to an embodiment. A system 100 can include a first wireless (WL) device 102 and a second WL device 104. A first WL device 102 can seek access to a network using a passphrase that can include a common password and specific password. A second WL device 104 can control access to a wireless network by validating and/or authenticating that a first WL device 102 is in possession of a valid common and specific password combination.

A second WL device 104 can establish and store one or more passphrases that can include a common password (common_pw) and specific password (specific_pw) 106-0. Such an action can include securely accessing the second device 104 and providing passphrase(s) to store in a memory circuits of the second WL device 104. It is understood that multiple passphrases can include a same common_pw but different specific_pw, enabling differentiated access to a network using a same common_pw. Passphrases can be stored in nonvolatile memory.

Both a first WL device 102 and second WL device 104 can generate an "element" with a FF transformation of a common_pw (106-1, 108-0). Such an action can include applying a common_pw in digital form to a cyclic function that can convert the common_pw to a value on a FF. In some embodiments such an action can include using an ECC function, and a resulting value can be a compressed ECC FF point representation. Further, additional operations (e.g., scalar multiplication, scalar addition, padding) can be applied to a FF point value to generate an element value (element1c, element2c). Along these same lines, prior to a transformation, similar operations can be applied to a common_pw.

Both a first WL device 102 and second WL device 104 can further generate scalar values. A scalar value can be any suitable number for executing key generation operations as described herein. Scalar values can include, but are not limited to, randomly generated numbers and nonces. A first WL device 102 can transmit its scalar value and element value (scalar1c, element1c) to the second WL device 104. Similarly, a second WL device 104 can transmit its scalar value and element value (scalar2c, element2c) to the first WL device 102.

Upon receiving scalar and element values from the second WL device 104 (scalar2c, element2c), first WL device 102 can generate a key value (Kc) 108-2. Upon receiving scalar and element values from the first WL device 102 (scalar1c, element1c), second WL device 104 can generate the same key Kc (assuming it has the same common password) 106-2.

First WL device 102 can encrypt a value with Kc that indicates it supports extended password operations (e.g., use of specific_pw with common_pw). First WL device 102 can then transmit a message with the encrypted value 110-2. Upon receiving the message 110-2, second WL device 104 can validate that the sending device (i.e., first WL device) can support extended password operations 106-3. Such an action can include decrypting a value with Kc, or comparing hashed values generated with Kc, or any other suitable cryptographic method. If extended password operations are not supported (N from 106-3), an alternate authorization method can be used 113.

A first WL device 102 and second WL device 104 can generate elements (element1s, element2s) with a FF transformation of specific_pw (106-3, 108-4). Such an action can include those described for generating element1c, element2c, but can include a different agreed upon transformation function. Scalar values can be generated, and elements and scalars values exchanged (110-3, 110-4). Upon receiving scalar and element values from the other WL device, first and second WL devices can generate a same key value (Ks) 110-5/6.

First and second WL devices (102 and 104) can exchange messages having a portion encrypted with Ks 110-5 and 110-6. If a first WL device 102 cannot validate message 110-6 received from a second WL device 104 using its Ks, the first device 102 can end the connection attempt 112-0. Similarly, if a second WL device 104 cannot validate message 110-5 received from a first WL device 102 with its Ks, a second device can end the connection attempt 112-1.

If first and second WL devices 102/104 both confirm their respective messages 110-5/6, each device can generate an initial key Kk using Ks 108-6/106-7. Using such an initial key, first and second WL devices 104/106 can establish a secure wireless connection 114. In some embodiments, establishing a secure wireless connection can include a four-way handshake process.

In this way, WL devices in a system can validate one another by exchanging FF elements generated with a common password, and then exchanging FF elements generated using a specific password. Once validated, the specific password can be used as a source value for establishing an encrypted connection.

Figure 2A:
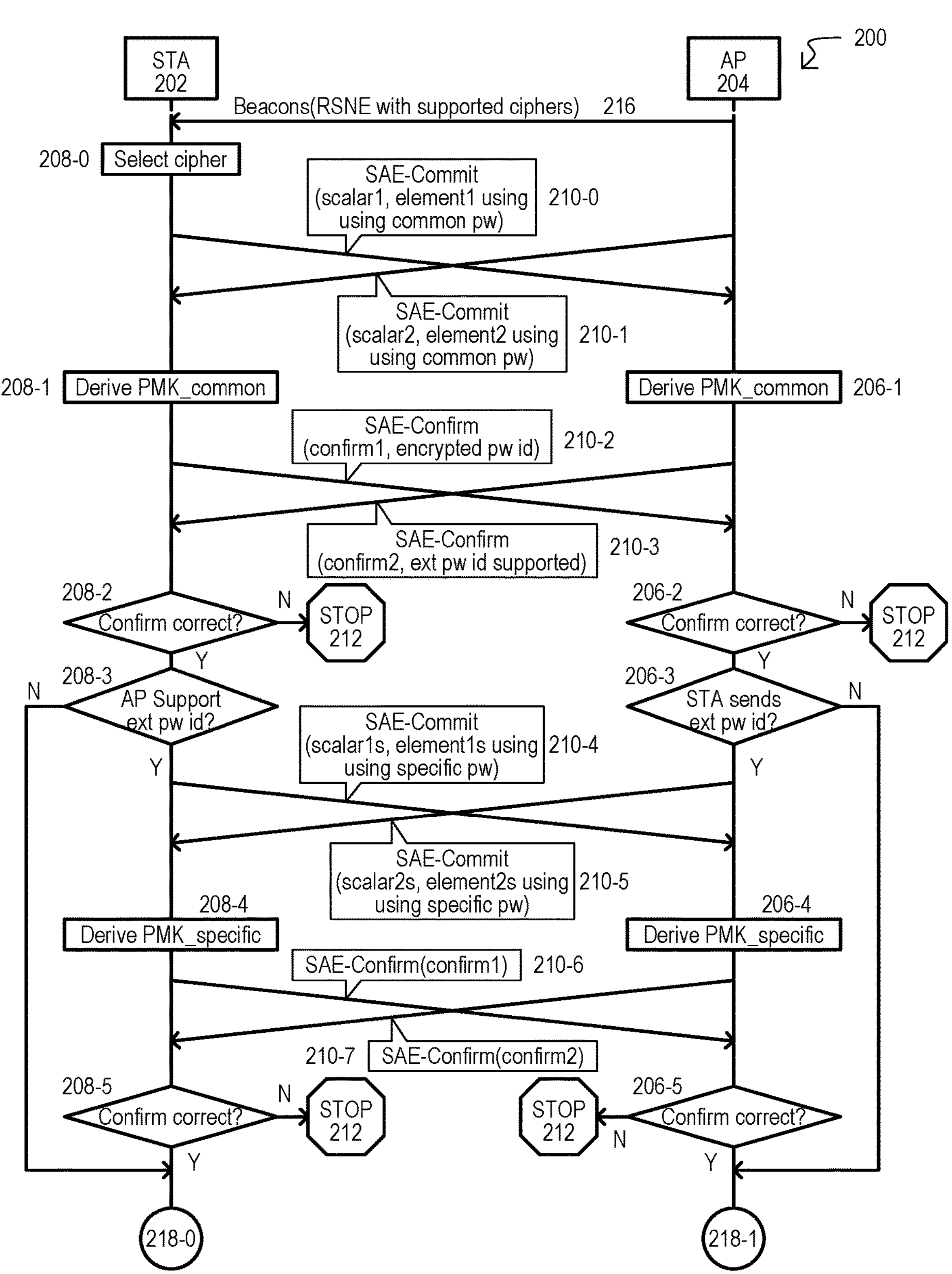
FIGS. 2A and 2B are signaling diagrams showing a system and corresponding operations according to another embodiment.
Figure 2B:
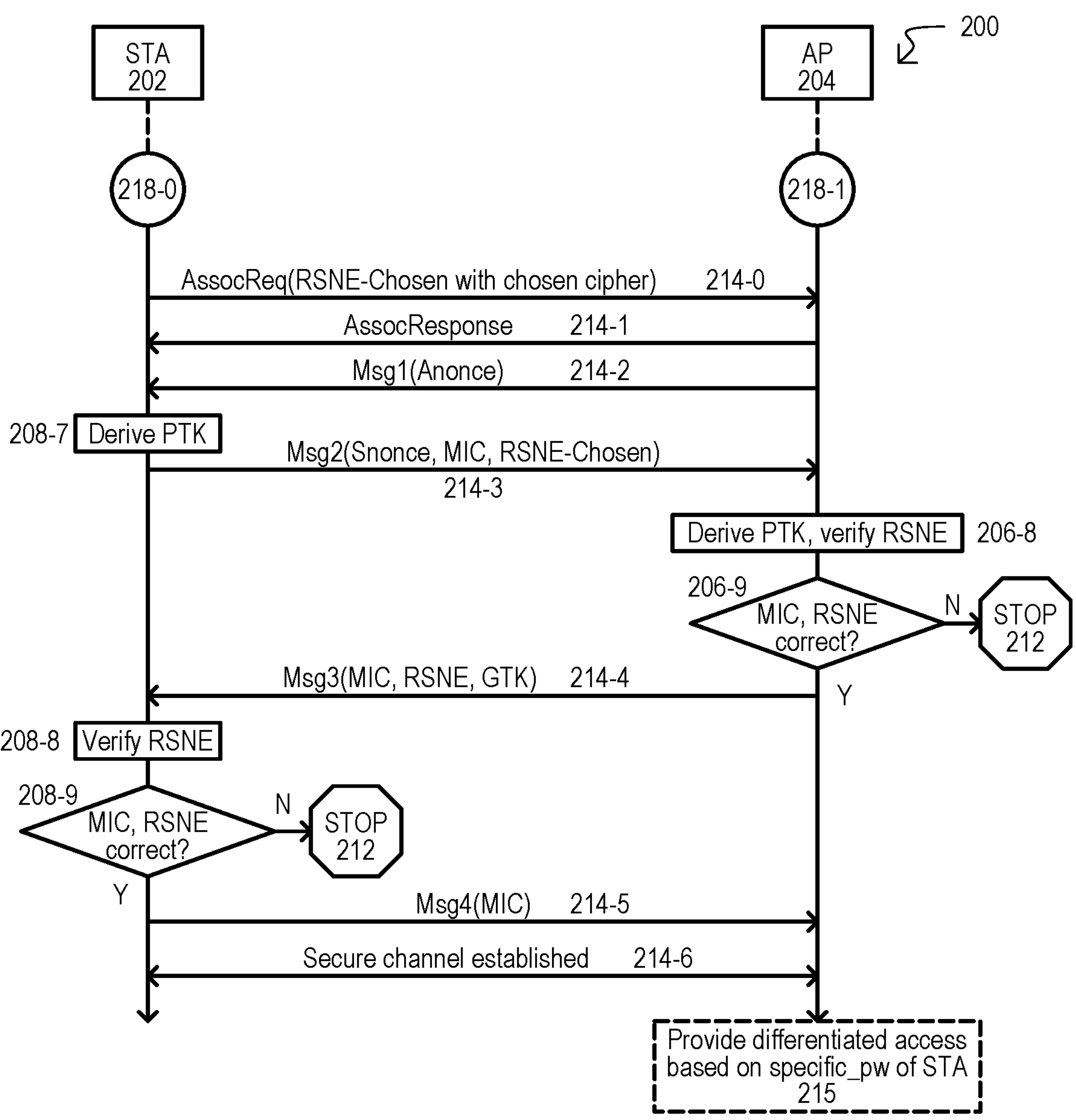

FIGS. 2A and 2B are signaling diagrams showing a system 200 and corresponding operations according to another embodiment. A system 200 can transmit messages compatible with one or more Wi-Fi standards. A system 200 can include a STA 202 and AP 204. AP 204 can control access to its network with passphrases that include a pw id value, a common_pw and a specific_pw. An AP 204 can transmit a data frame 216 that can be received by a STA 202, that can include a Robust Security Network Element (RSNE) that can indicate cipher suites supported by the AP 204. In some embodiments, such a data frame 216 can be a beacon and/or a probe response issued in response to a probe request from STA 202. A STA 202 can select a cipher 208-0 for use in follow-on communications to AP 204.

STA 202 can generate an element from a common_pw (element1) as well as a scalar (scalar1). Similarly, AP 204 can generate a scalar (scalar2) and element (element2) from a common_pw. Such actions can include any of those described herein, or equivalents. In some embodiments, element1 and element2 can be generated by using an agreed upon ECC function. STA and AP (202 and 204) can each issue SAE commit messages (210-0/1) that include their respective scalar and element. In response such SAE commit messages, STA and AP (202 and 204) can generate a pairwise master key (PMK) PMK_common (208-1, 206-1). STA 202 can generate PMK_common using at least scalar2 and element2. AP 204 can generate PMK_common using at least scalar1 and element1. If STA 202 and AP 204 are in possession of a same common_pw, they will both generate a same PMK_common.

After generating PMK_common, STA and AP (202 and 204) can each issue SAE confirm messages (210-2/3). An SAE confirm message 210-3 from an AP 204 can indicate that extended password identification is supported. Such an action can include providing particular values in fields of the data frame. An SAE confirm message 210-2 from a STA 202 can include a pw id value encrypted with PMK_common. STA and AP (202 and 204) can attempt to validate their received SAE confirm message using their generated PMK_common (206-2, 208-2). In the case of AP 204, such an action can include decrypting to determine the encrypted pw id value in the received confirm message, and then confirming the pw id value corresponds to a stored passphrase. If either STA or AP (202 or 204) cannot confirm their received SAE confirm message (N from 206-2 or 208-2), an authentication operation can end 212.

If a STA 202 confirms a SAE confirm message (Y from 208-2), it can determine if the AP supports extended pw id authentication 208-3. If extended pw id is not supported (N from 208-3), a STA 202 can proceed to an alternate (e.g., not extended pw id) authentication method (proceed to 218-0, also shown in FIG. 4B). If AP 204 confirms a SAE confirm message (Y from 208-2), it can determine if the STA message included an indication that extended pw id operations are supported 206-3. Such an action can take any suitable form. A SAE commit data frame received from a STA can include a particular field value that indicates support for extended pw id operations, such a field may or may not be decrypted by AP using PMK_common. In some embodiments, decrypting with PMK_common to determine a pw id value from the STA can indicate to the AP that extended pw id operations are supported. If extended pw id is not supported (N from 206-3), an AP 204 can proceed to an alternate authentication method (proceed to 218-1, also shown in FIG. 4B).

If STA and AP (202 and 204) both support extended pw id operations (Y from 208-3 and 206-3), STA 202 can generate another element value (element1s) and scalar value (scalar1s). AP 204 can generate an element (element2s) and scalar (scalar2s). Element values (element1s, element2s) can be FF values generated with a transformation of a specific_pw, as described herein, or equivalents, including the use of an agreed upon ECC function. Such values can be exchanged with SAE commit messages 210-4/5. In response such SAE commit messages, STA 202 can generate a key PMK_specific using at least scalar2s and element2s. AP 204 can generate PMK_specific using at least scalar1s and element1s. If STA 202 and AP 204 are in possession of a same specific_pw, they will both generate a same PMK_specific.

STA and AP (202 and 204) can exchange SAE confirm messages 210-6/7, and attempt to validate their received SAE confirm messages using their generated PMK_specific (206-5, 208-5). In some embodiments, such an action can include decrypting one or more fields of the SAE confirm message using PMK_specific. If either STA or AP (202 or 204) cannot confirm their received SAE confirm message (N from 206-5 or 208-5), an authentication operation can end 212.

Referring to FIG. 2B, if STA and AP (202 and 204) can validate their received SAE confirm messages (Y from 218-0/1), the two devices can establish a secure connection using PMK_specific. In the embodiment shown, this can include executing a four way handshake, however, any other suitable operation can be used.

Referring still to FIG. 2B, a STA 202 can transmit an association request 214-0, which can include an RSNE and use a chosen cipher 214-0. AP 204 can return an association response 214-1. AP and STA (204 and 202) can then start a four-way handshake to establish a secure channel.

In the four-way handshake shown, AP 204 can generate an a nonce (Anonce) and transmit it to STA 202 in a first handshake message 214-2. A STA 202 can generate its own nonce (Snonce), and derive a pairwise transient key (PTK) 208-7. Such an action can include deriving a PTK with a pseudo-random function (PRF) from a chosen cipher suite using Anonce, Snonce, a MAC address of AP 204, and a MAC address of STA 202 and a PMK. If AP and STA (202 and 204) have both previously validated a PMK_specific (Y from 208-5 and 206-5), a PMK used for deriving PTK can be PMK_specific. However, if AP and STA (202 and 204) have both indicated no support for extended pw id operations (N from 208-3, 206-3), the PMK used for deriving PTK can be a Pre-Shared Key (PSK) derived using any suitable manner. A STA 202 can transmit a second message 214-3 to AP 204 that can include Snonce, a MIC and the cipher suite chosen.

AP 204 can derive a PTK in the same fashion as STA, and verify the RSNE. AP can then attempt to validate the MIC using selected cipher suite 206-9. If a MIC in message 214-3 is not correct (N from 206-9), an AP 204 can end an authentication operation 212. If a MIC in message 214-3 is correct (Y from 206-9), an AP 204 can generate its own MIC and a Group Temporal Key (GTK) and transmit such values in a third message 214-4 to STA 202.

STA 202 can verify the RSNE 208-8. STA 202 can then attempt to validate the MIC using selected cipher suite 208-9. If a MIC in message 214-4 is not correct (N from 208-9), an AP 204 can end an authentication operation 212. If a MIC in message 214-4 is correct (Y from 208-9), STA 202 can generate another MIC that can indicate it is in possession of the keys, and transmit it in a fourth message 214-5. A secure channel can be established 214-6.

Optionally, an AP 204 can provide differentiated access to its network based on the specific_pw of the authenticated STA 215.

In this way, a system can use a SAE operation to exchange cryptographic values generated with a common password, and establish if extended password operations are supported. If such operations are supported, a system can use another SAE operation to exchange cryptographic values using a specific password. A secure connection can be established with keys generated based on the specific password.

Figure 3:
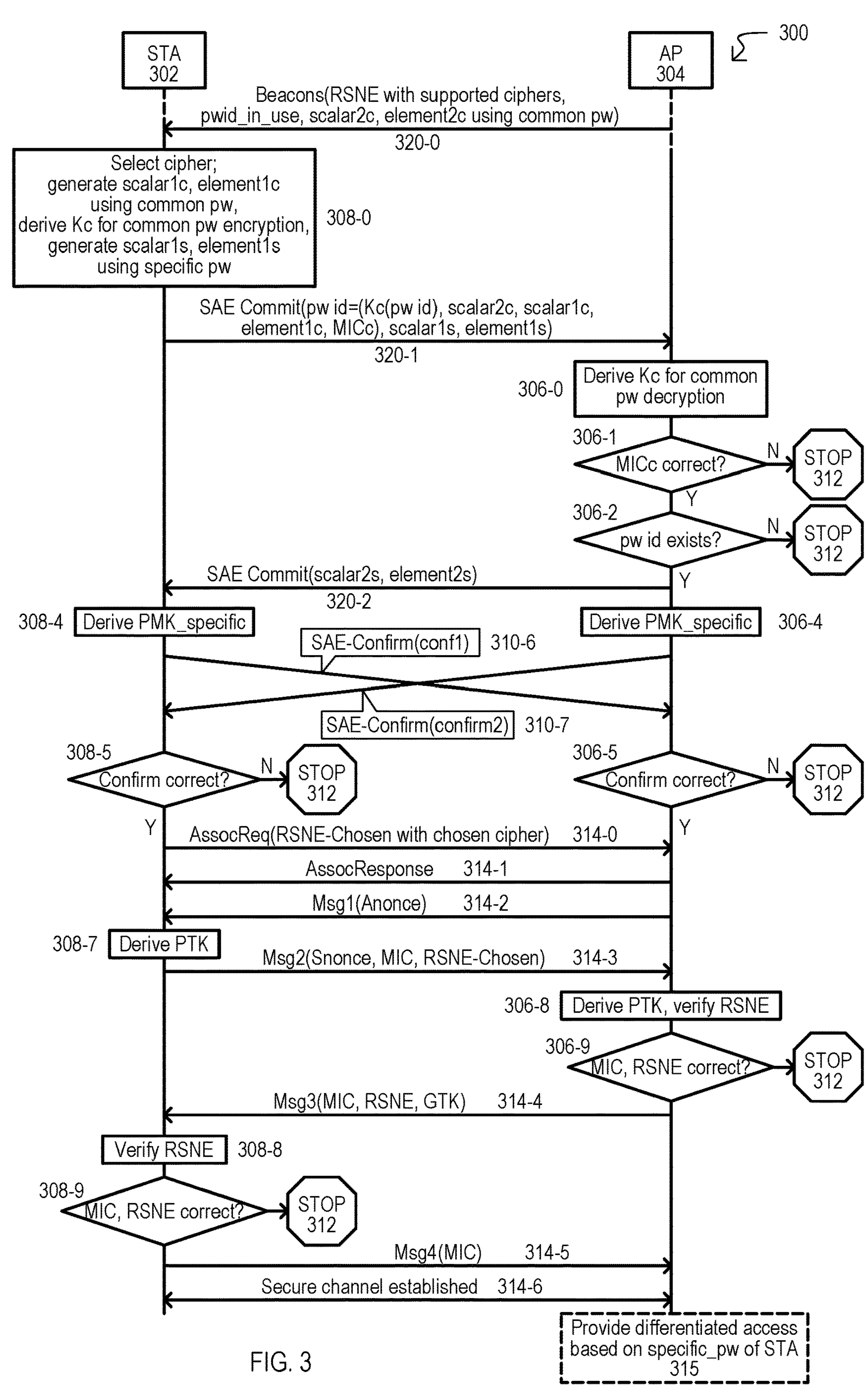
FIG. 3 is a signaling diagram showing a system and corresponding operations according to a further embodiment.

FIG. 3 is a signaling diagram showing a system 300 and operations according to another embodiment. As in the case of FIGS. 2A and 2B, a system 300 can transmit messages compatible with one or more Wi-Fi standards, and AP 304 can control access to its network with passphrases that include a password id (pwid) value, a common_pw and a specific_pw.

An AP 304 can generate a scalar value (scalar2c) and an element value (element2c) using common_pw, as described for FIG. 2A. AP 304 can transmit a data frame 320-0 that can be received by a STA 302. Such a data frame 320-0 can include the following: an RSNE indicating cipher suites supported by the AP 304, a value that indicates extended password id operations are supported, a scalar2c, and an element2c. Such values can take the form of those described in FIG. 2A or equivalents. As in the case of FIG. 2A, a data frame 320-0 can be a beacon and/or a probe response issued in response to a probe request from STA 302.

In response to receiving the beacon/probe 320-0, a STA 302 can perform a number of actions, including but not limited to: selecting a cipher for use in follow-on communications; generating a scalar1c; generating an element1c using a common_pw; deriving an encryption key Kc, generating a scalar1s; and generating an element1s using specific_pw. Scalar1c, element1c, scalar1s and element1s can be generated as described in FIG. 2A or an equivalent. A STA 302 can derive an encryption key Kc, using at least scalar1c, element1c, scalar2c and element2c. STA can encrypt a pw id value with Kc (Kc(pw id)). STA 302 can transmit a SAE commit message that includes Kc(pw id), scalar2c, scalar1c, element1c and a MIC of such values (MICc), as well as scalar 1s and element1s. In some embodiments, SAE commit message 320-1 can include a non-printable character in a pw id field, which can indicate that the message includes an encrypted pw id, and not a clear text pw id, that may be used in alternate authentication processes.

In response to the SAE commit message 320-1, AP 304 can derive Kc, and using Kc, determine if the received MICc is correct 306-1. If MICc is not correct (N from 306-1), an authentication operation can end 312. If MICc is correct (Y from 306-1), an AP 304 can determine the pw id by decrypting with Kc. If a decrypted pw id does not exist (e.g., is not part of a passphrase stored by AP 304), an authentication operation can end 312. If a decrypted pw id does exist, AP 304 can transmit an SAE commit message 320-2 that can include a scalar2s and element2s generated with a specific_pw.

A system 200 can proceed with operations that can be the same or equivalent to that of FIGS. 2A and 2B, starting with the derivation of PMK_specific values (308-4, 306-4). Such like operations have the same reference character with the leading digit being a “3” instead of “2”.

In this way, a system can include an AP that transmits data frames with cryptographic values generated with a common password. A STA can return values encrypted with a key generated using a common password for confirmation by an AP. A system can use an SAE operation to exchange cryptographic values using a specific password. A secure connection can be established with keys generated based on the specific password.

Figure 4A:
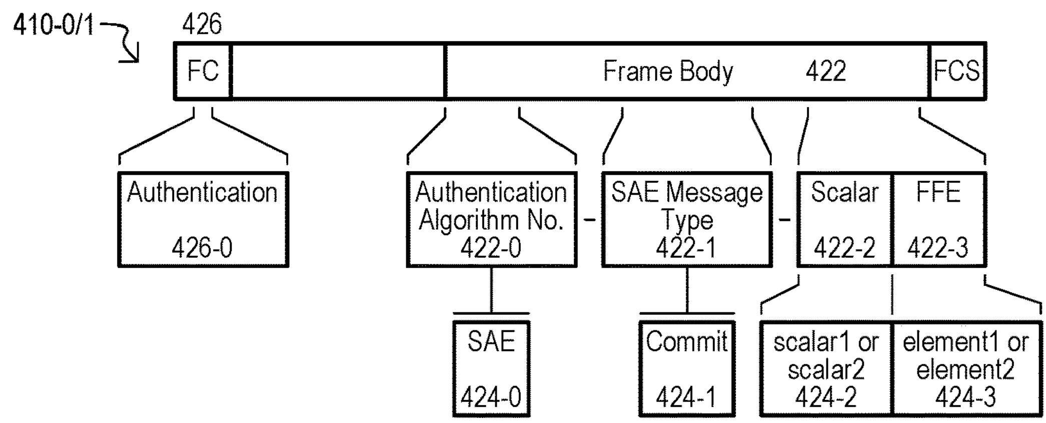
FIGS. 4A to 4C are diagrams showing data frames according to embodiments.
Figure 4B:
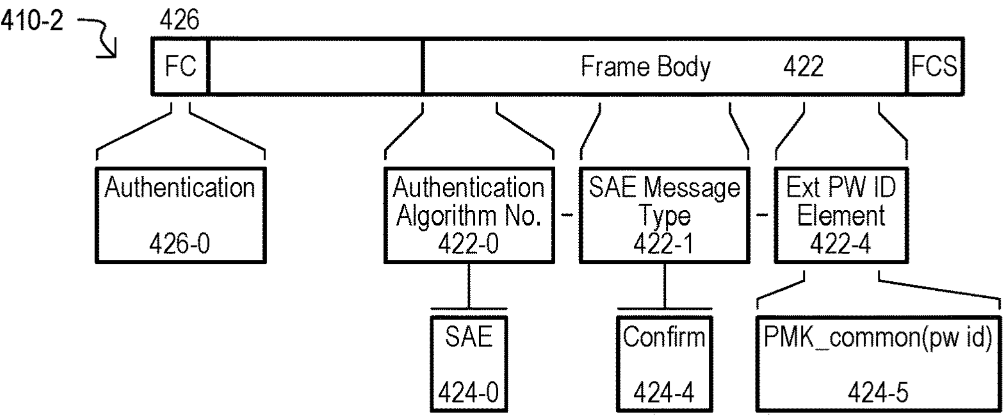
Figure 4C:
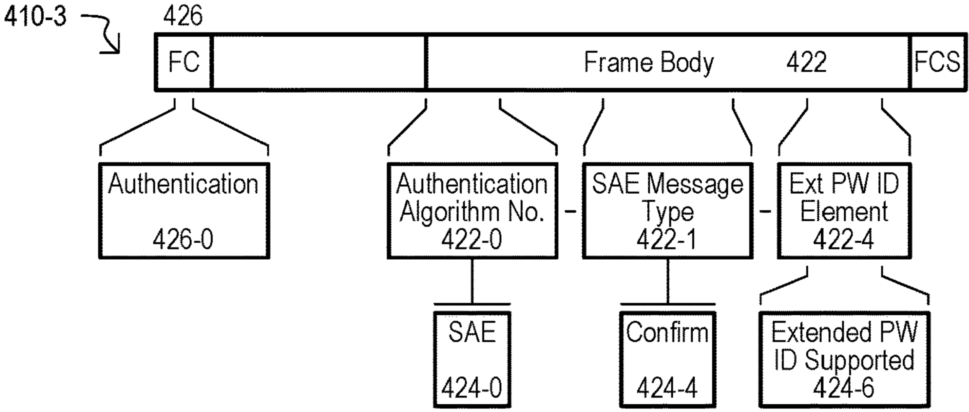

FIGS. 4A to 4C are diagrams of data frames according to embodiments. FIG. 4A is a data frame 410-0/1 that can be transmitted by an AP or STA in an SAE exchange according to an embodiment. A data frame 410-0/1 can be compatible with one or more Wi-Fi standards, and include various fields, including a frame control field 426 and frame body 422. A frame control field 426 can indicate an authentication type frame 426-0. A frame body 422 can include various fields, including an authentication algorithm number field (auth. alg. no.) 422-0, SAE message type 422-1, a scalar field 422-2 and a finite field element field (FFE) 422-3. Auth. Alg. No. can indicate an SAE operation 424-0, SAE message type can indicate a commit message 424-1. In the case of a STA SAE commit message, a scalar field and FFE field (422-2/3) can include a scalar1 value and element1 value (i.e., a scalar generated from a common_pw and corresponding scalar for generating a matching key). In the case of an AP commit message, a scalar field and FFE field (422-2/3) can include a scalar2 value and element2 value (i.e., a scalar generated from a specific_pw and corresponding scalar for generating a matching key).

In this way, embodiments can include data frames with FF elements generated by transforming a common password and a corresponding scalar value.

FIG. 4B shows a STA confirm data frame 410-2 according to an embodiment. Data frame 410-2 can include fields like those of FIG. 4A, and such like fields are referred to by the same reference characters. Data frame 410-2 can differ from that of FIG. 4A in that a message type can be a confirm message 424-2 and an extended password id element field 422-2 can be included. Extended password id element field 422-4 can include a pw id value encrypted with a PMK_common.

In this way, embodiments can include data frames with a pw id value encrypted with a key generated using the transformation of a common_pw into a FF element.

FIG. 4C shows an AP confirm data frame 410-3 according to an embodiment. Data frame 410-3 can include fields like those of FIG. 4B, and such like fields are referred to by the same reference characters. Data frame 410-3 can differ from that of FIG. 4B in that an extended password id element field 422-4 can include a value 424-6 that indicates extended pw id operations are supported.

In this way, embodiments can include data frames with a field that indicates extended password operations can be supported, where extended pw id operations can use encryption keys generated from a common_pw and specific_pw of a same passphrase.

Figure 5A:
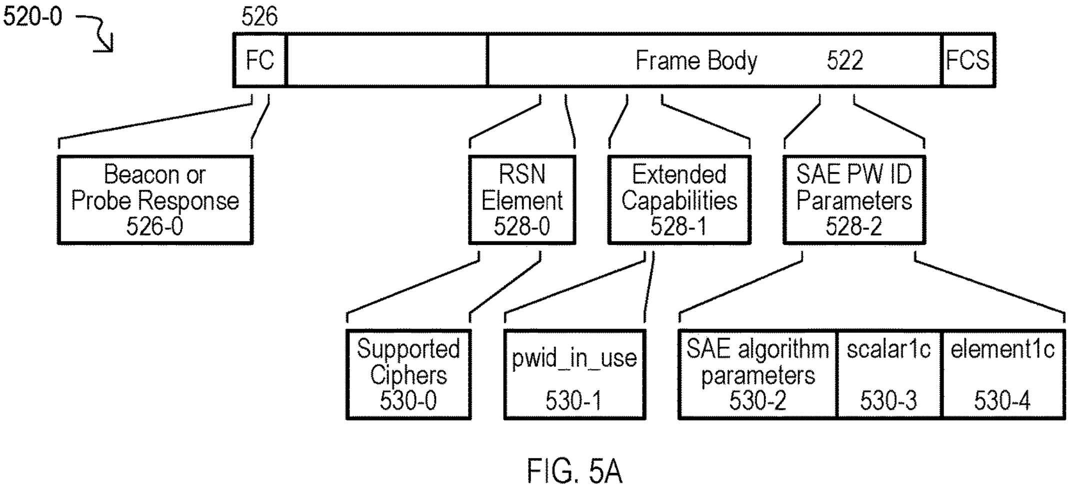
FIGS. 5A and 5 B are diagrams showing data frames according to other embodiments.
Figure 5B:
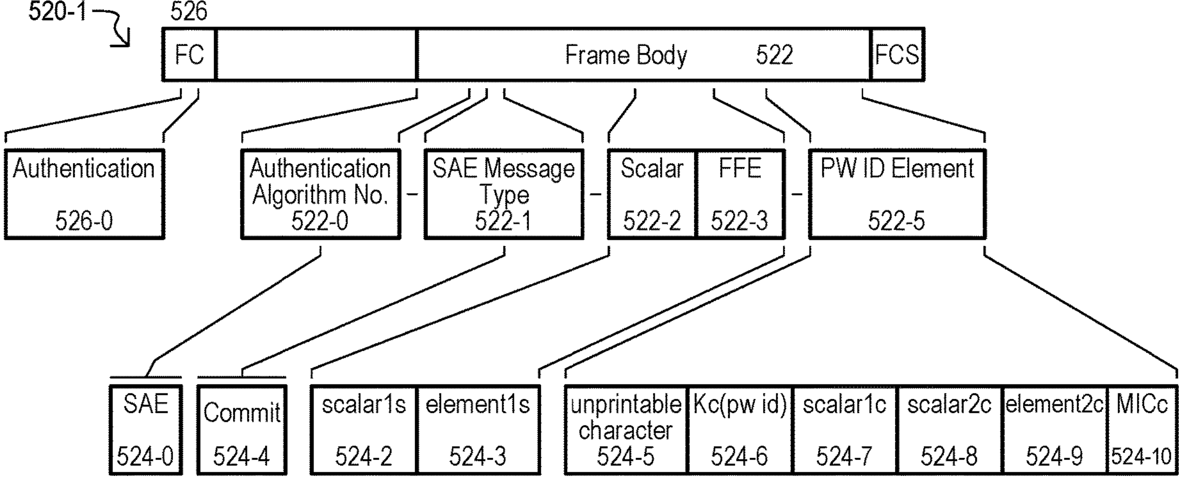

FIGS. 5A and 5B are diagrams of data frames according to additional embodiments. The data frames of FIGS. 5A to 5C can include items like those of FIGS. 4A to 4C. Such like items are referred to by the same reference character, but with the leading digit being a “5” instead of a “4”.

FIG. 5A shows a data frame 520-0 that can be transmitted by an AP. A data frame 520-0 can include a frame control field 526 that indicates a beacon or probe response. A frame body 522 can include a RSNE field 528-0, an extended capabilities field 528-1 and SAE password id (PW ID) parameters field 528-2. RSNE field 528-0 can indicate supported ciphers 530-0. Extended capabilities field 528-1 can include a value 530-1 that indicates a pw id is in use. SAE PW ID parameters field 528-2 can include SAE algorithm parameters 530-2 (for an extended password authentication operation), a scalar1c value 530-3 and an element 1c value 530-3. Scalar1c and element1c can be generated as described herein, or equivalents.

In this way, embodiments can include an AP beacon or probe response that can indicate that extended pw id operations are supported, as well as include a element value generated by transforming a common password into an FFE.

FIG. 5B shows an SAE commit data frame 520-1 that can be transmitted by a STA. A data frame 520-1 can differ from that of FIG. 4A in that it can include Data frame 520-1 having a PW ID element 522-5. A PW ID element 522-5 can include a non-printable character 524-5, a pw id encrypted with a key (Kc(pw id)), the common password element and scalar received in the beacon/probe response 524-7/8), a common password element and scalar generated by the STA (e.g., scalar2c, element2c) 524-8/9, and MIC for values in the PW ID element field (MICc) 524-10. A key Kc can be generated using at least a common password element and scalar (e.g., scalar1c, element1c) received in a beacon/probe response. A non-printable (unprintable) character 524-5 can be a value that does not correspond to valid symbol according to an encoding scheme usable to establish a common password or specific password.

In this way, embodiments can include a data frame a non-printable character to indicate extended password operations are supported, as well as a pwid encrypted with a key generated by an FFE element received from an AP device.

It is understood that the data frames of FIGS. 4A to 5B are provided by way of example and should not be construed as limiting. The various messages described for the embodiments herein can vary according to a particular authentication method and/or communication protocol/standard used, as would be well understood by those skilled in the arts.

Figure 6A:
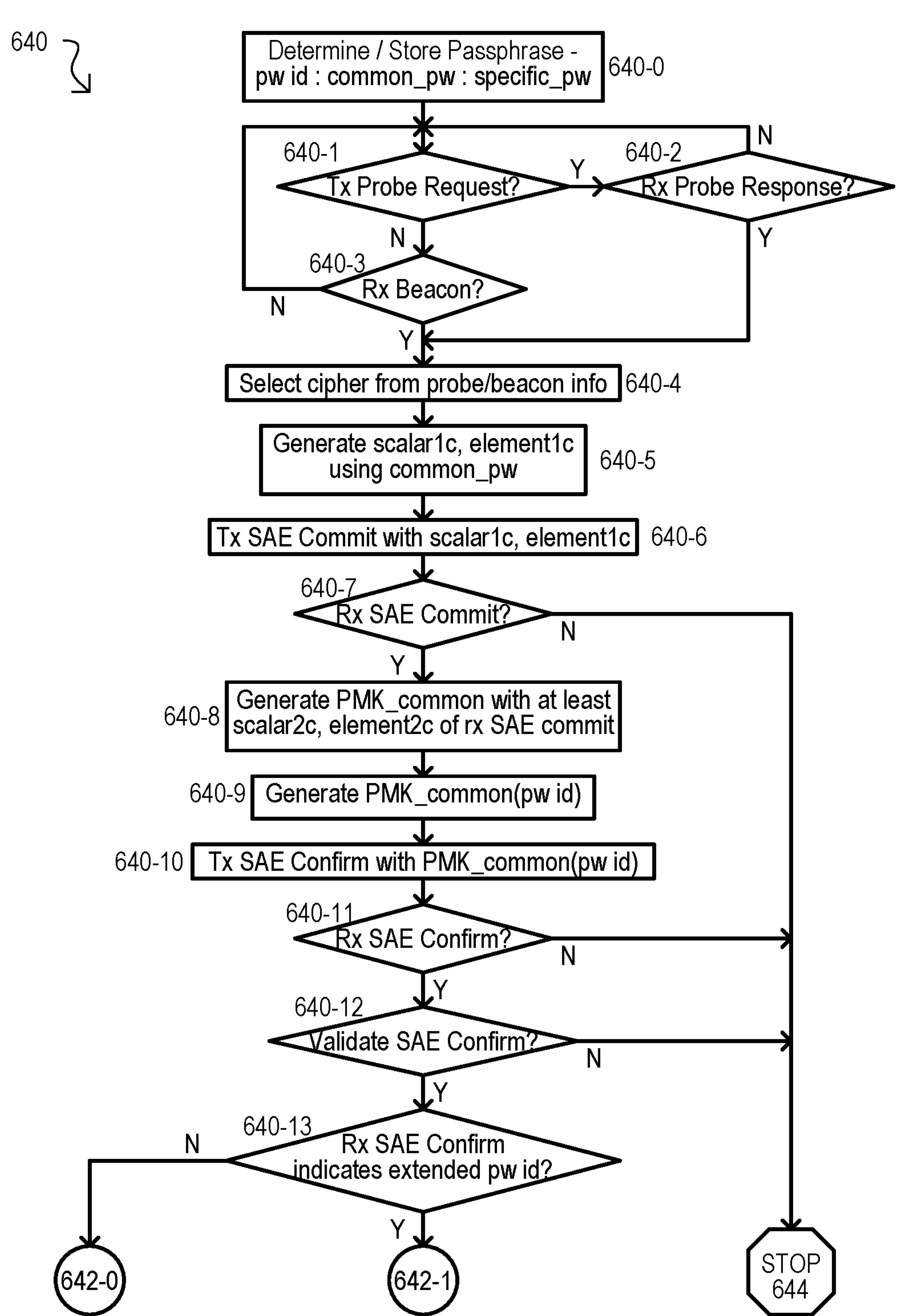
FIGS. 6A and 6B show a flow diagram of a method executable by a wireless device according to an embodiment.
Figure 6B:
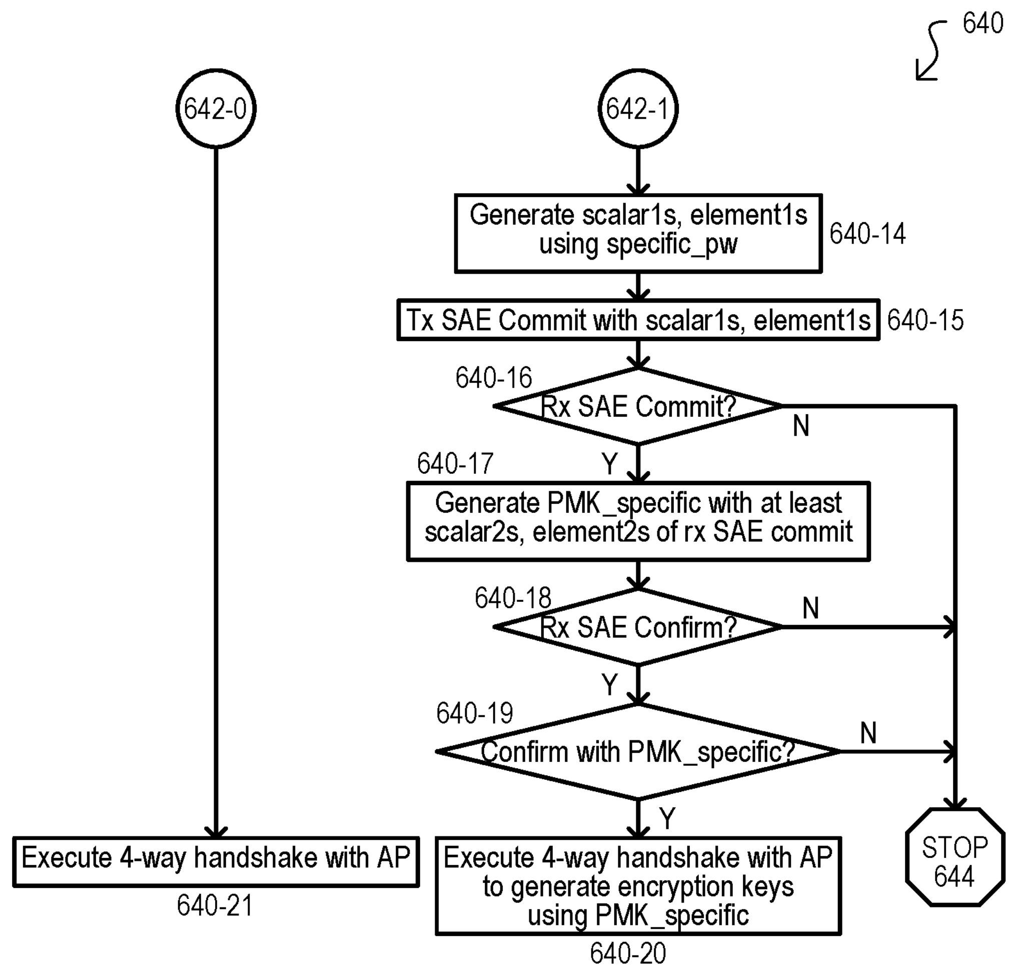

FIGS. 6A and 6B show a flow diagram of a method 640 according to an embodiment. FIG. 6A is connected to FIG. 6B at circles 642-0 and 640-1. In some embodiments, a method 640 can be executed by circuits of a STA (i.e., a station device according to one or more Wi-Fi standards). A method 640 can include determining and storing a passphrase 640-0. Such an action can include storing a passphrase in nonvolatile memory of a STA. A passphrase can have a common password, which may be distributed to one or more other users/devices, as well as a specific password, that is intended to be unique to the device/user executing the method 604. In some embodiments, a passphrase can include a pw_id+separating character+common_pw+separating character+specific_pw. A pw_id, common_pw and specific_pw can be variable length strings compatible with a character encoding used by the standard/protocol (e.g., UTF-8). A separating character can be a predetermined character, such as a colon ":".

A method 640 can determine if the device is to transmit a probe request 640-1 for accessing an AP to start an authentication process. If a probe request is issued (Y from 640-1), a method can wait for the reception of a probe response 640-2. If a probe request is not transmitted (N from 640-1), a method can determine if a beacon has been received 640-3. If a probe response or beacon is received (Y from 640-2 or 640-3), a method can select a cipher for use in communications to the transmitting device (e.g., AP) 640-4.

At 640-5 a scalar (scalar1c) can be generated, and an element (element1c) can be generated. In some embodiments, scalar1c can be a random number or nonce of suitable size for the cryptographic function being used to generate a key (PMK_common). Element1c can be generated by a function that transforms common_pw into a FF element, as described herein or equivalents. In some embodiments, such a function can be a ECC function.

A method 640 can transmit an SAE commit message that includes scalar1c and element1c 640-6. If a corresponding SAE commit message is not received (N from 640-7), a method can end 644. In some embodiments, such an action can include waiting for a predetermined timeout period. If a corresponding SAE commit message is received (Y from 640-7), a method can generate a key PMK_common using at least a scalar (scalar2c) and element (element2c) present in the received SAE commit message 640-8. In some embodiments, PMK_common can be generated with scalar2c, element2c, and at least a portion of scalar1c. In some embodiments, PMK_common can be generated using scalar2c, element2c, scalar1c, and element1c. The pw id from the stored passphrase can be encrypted using PMK_common (e.g., generate PMK_common(pw id)) 640-9. An SAE confirm message can be transmitted that includes PMK_common(pw id) 640-10.

If a corresponding SAE commit signal is not received (N from 640-11), a method can end 644. In some embodiments, such an action can include waiting for a predetermined timeout period. If a corresponding SAE commit message is received (Y from 640-11), a method can attempt to validate the received SAE confirm message 640-12. Such an action can include using PMK_common to decode a portion of the message and/or executing some other suitable validation operation, including but not limited cryptographic hash functions that include use of PMK_common. If a received SAE confirm message cannot be validated (N from 640-12), a method can end 644. If a received SAE confirm message is validated (Y from 640-12), a method can determine if the SAE confirm message indicates the transmitting device supports extended password operations 640-13.

Referring to FIG. 6B, if the SAE confirm message indicates that the transmitting device does not support extended password operations (N from 640-13, 640-0), a method can execute a conventional four-way handshake operation with an AP to create a secure connection 640-21 (e.g., a four-way handshake that does not use a source value for generating PMKs that is based on a specific_pw).

If the SAE confirm message indicates that the transmitting device does support extended password operations (Y from 640-13, 642-1), a method can generate a scalar (scalar1s) and an element (element1s) 640-14. Such actions can include any of those described for scalar1c/element1c, except that element1s can be generated using specific_pw. Further, generation of element1s may or may not use a different transformation function than that used for element1c depending upon the cipher (suite) selected (e.g., in 640-04 of FIG. 6A). A second SAE commit message can be transmitted that includes scalar1s and element1s 640-15.

If a corresponding second SAE commit message not received (N from 640-16), a method can end 644. If a corresponding second SAE commit message is received (Y from 640-16), a method can generate a key PMK_specific using at least a scalar (scalar2s) and element (element2s) present in the received SAE commit message 640-17. PMK_specific can be generated with scalar2s, element2s, and the FFE element generated by transforming specific_pw. In some embodiments, PMK_common can be generated using scalar2s, element2s, scalar1s, and element1s.

If a corresponding second SAE confirm message is not received (N from 640-18), a method can end 644. If a corresponding second SAE commit message is received (Y from 640-18), a method can attempt to validate the received second SAE confirm message 640-19. Such an action can include using PMK_specific to decode a portion of the message and/or executing some other suitable validation operation, including but not limited cryptographic hash functions that include use of PMK_specific. If a received second SAE confirm message cannot be validated (N from 640-19), a method can end 644. If a received second SAE confirm message is validated (Y from 640-18), a method can execute a four-way handshake operation with an AP to generate encryption keys using PMK_specific 640-20. In some embodiments, such an action can include, but is not limited to, using PMK_specific to generate a PTK.

In this way, a device can receive scalar and element values corresponding to a common password and specific password, and generate pairwise master keys in two SAE exchanges.

Figure 7A:
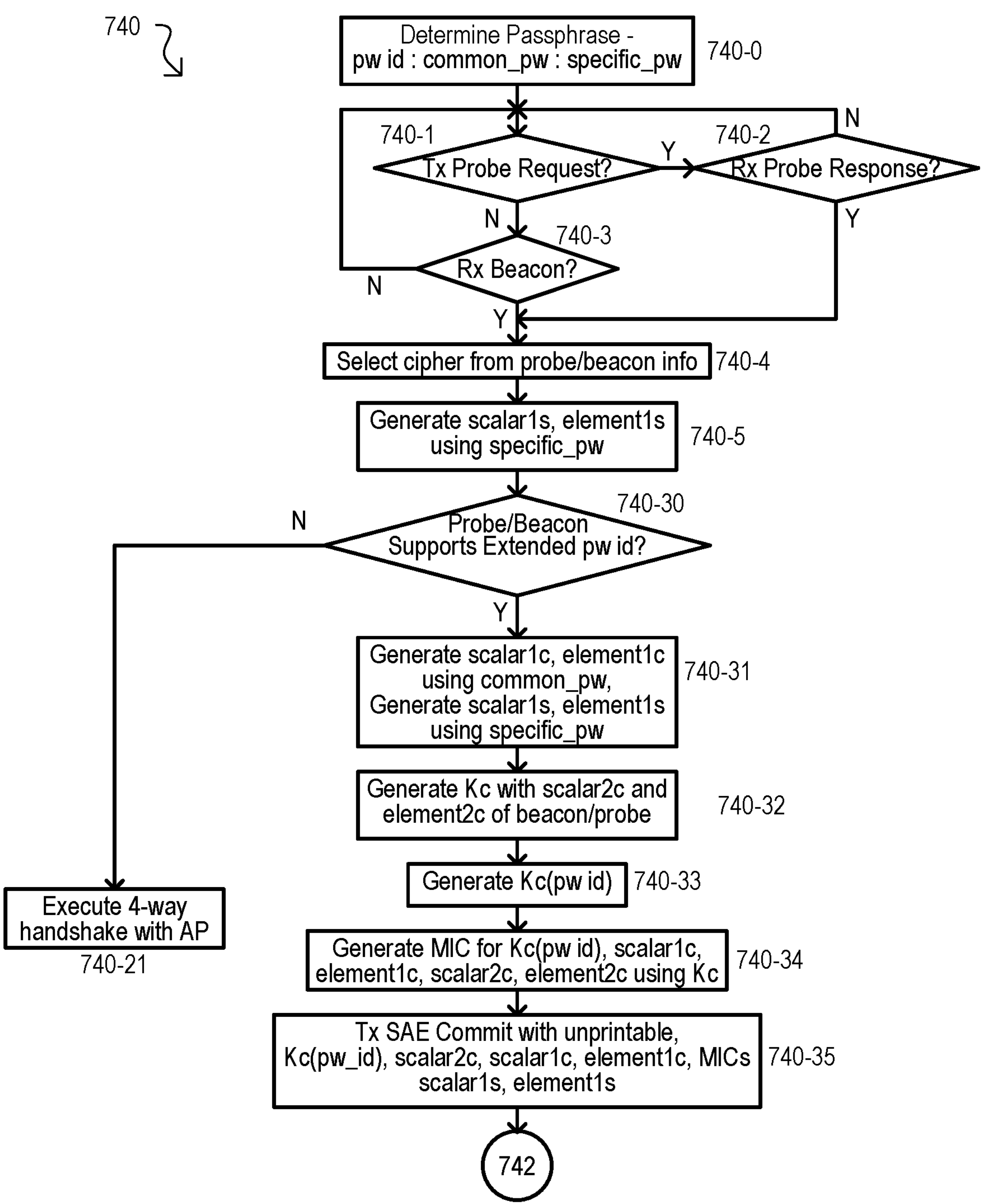
FIGS. 7A and 7B show a flow diagram of a method executable by a wireless device according to another embodiment.
Figure 7B:
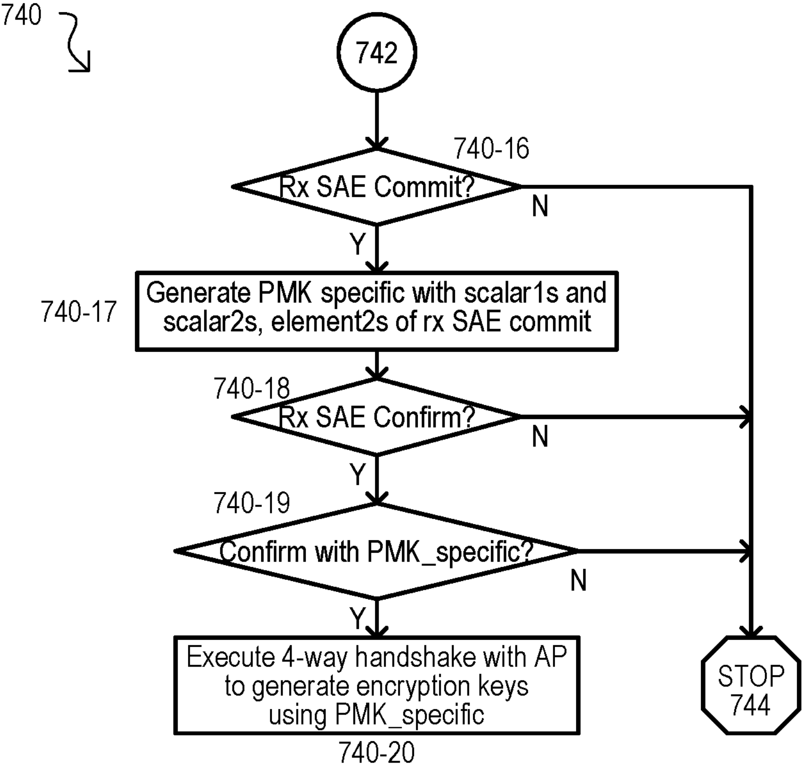

FIGS. 7A and 7B show a flow diagram of a method 740 according to another embodiment. FIG. 7A is connected to FIG. 7B at circle 742. In some embodiments, a method 740 can be executed by circuits of a STA. A method 740 can include items like those of FIGS. 6A and 6B, and such like items are referred to by the same reference character but with the leading digit being a "7" instead of a "6".

FIG. 7A can include actions 740-0 to 740-5, which can occur in the same or an equivalent manner to 640-0 to 640-5 shown in FIG. 6A.

A method 740 can include determining if a received probe or beacon indicates extended password capabilities are supported by the transmitting device 740-30. If such capabilities are not supported (N from 740-30), a method can execute an alternative four-way handshake operation with an AP to create a secure connection 740-21.

If extended password capabilities are supported (Y from 740-30), a method can generate a scalar1c and element1c using a common password, as well as a scalar1s and element1s using a specific password 740-31. Scalars (scalar1c, scalar1s) and elements (element1c, element1s) can be generated as described for embodiments herein, or equivalents. A key (Kc) can be generated using at least a value scalar2c and element2c received in a probe or beacon 740-32. In some embodiments, Kc can be generated using scalar1c and/or element1c in addition to scalar2c and element2c. A pw id can be encrypted with Kc 740-33. A MIC can be generated for Kc(pw id), scalar1c, element1c, scalar2c and element2c using Kc (i.e., generate MICc). An SAE commit message can be transmitted that includes a non-printable character, Kc(pw id), scalar1c, scalar2c, element2c, MICc, scalar1s and element1s 740-35.

Referring to FIG. 7B, a method 740 can proceed with actions 740-16, -17, -18, -19, -20 and 744 in a corresponding, or equivalent fashion as FIG. 6B.

In this way, a device can receive a FFE corresponding to a common password in a beacon or probe response. The device can generate a first key using the and send a message encrypted with such a key. In this way, a device can then receive a specific password, and generate pairwise master keys in an SAE exchange.

Figure 8A:
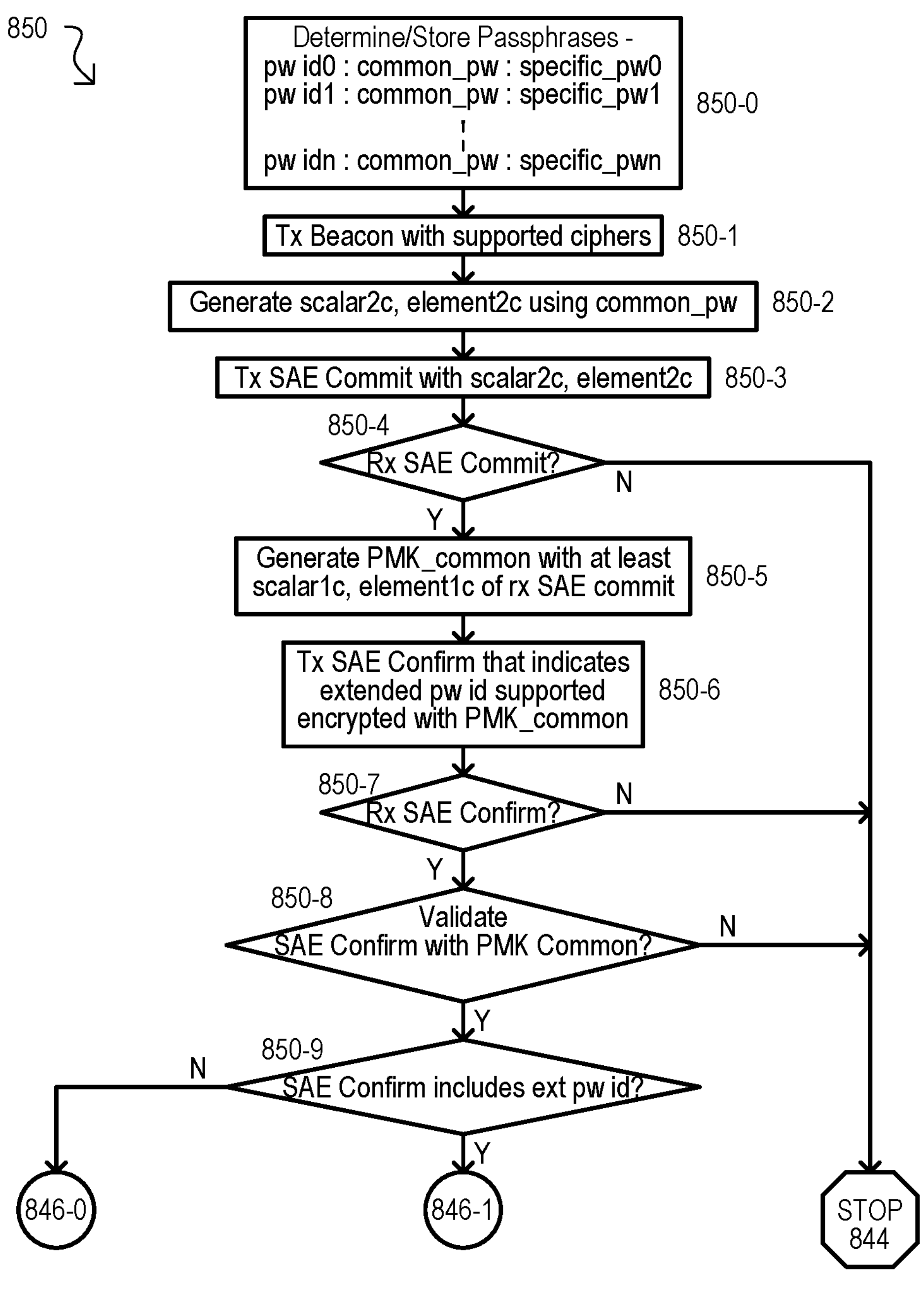
FIGS. 8A and 8B show a flow diagram of a method executable by a wireless device according to a further embodiment.
Figure 8B:
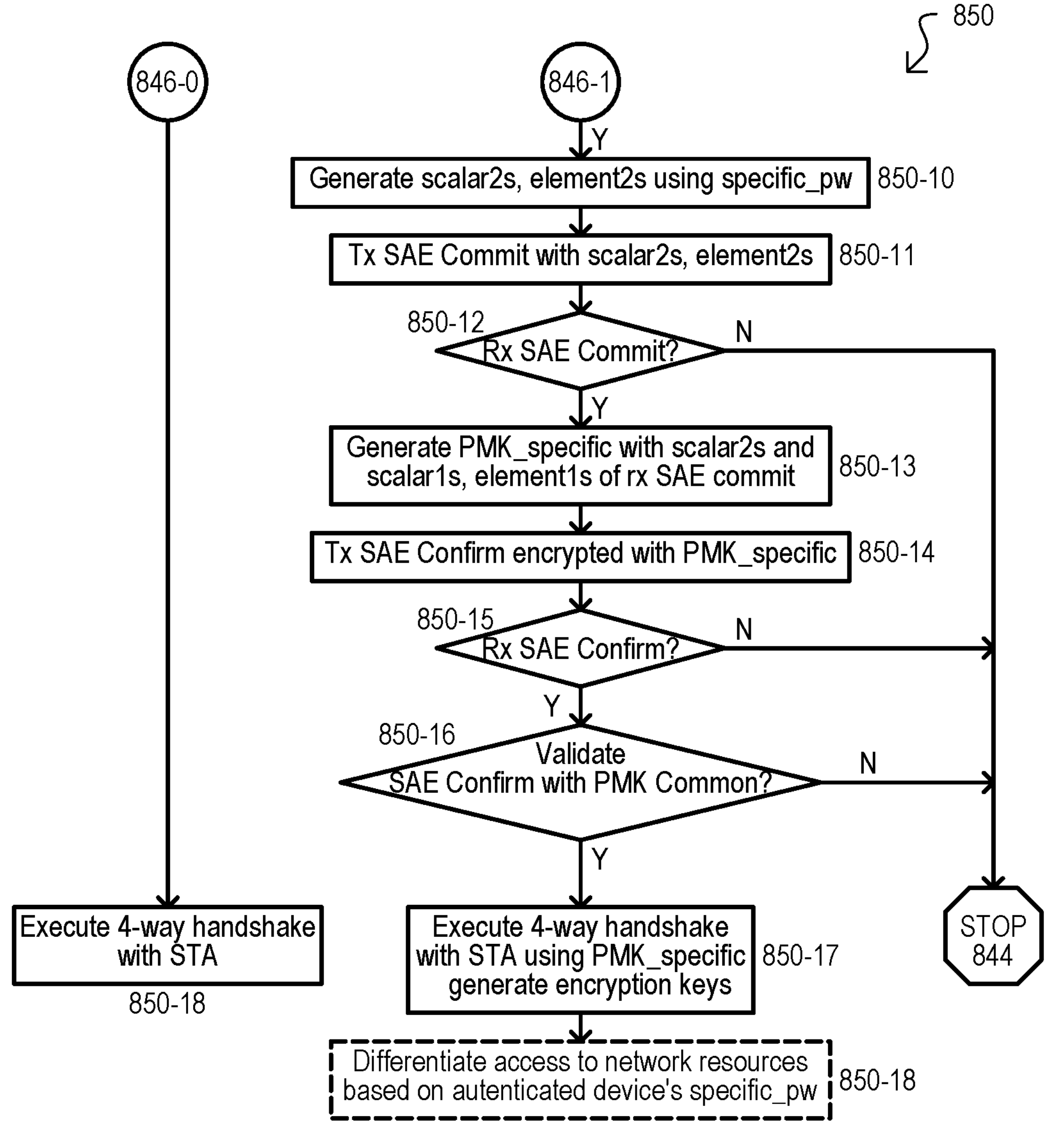

FIGS. 8A and 8B show a flow diagram of a method 850 according to an embodiment. In the flow diagram of method 850, FIG. 8A is connected to FIG. 8B at circles 846-0 and 846-1. In some embodiments, a method 850 can be executed by circuits of an AP. A method 850 can include determining and storing passphrases corresponding to multiple devices/users 850-0. Such an action can include storing passphrases in nonvolatile memory of a device (e.g., AP). Passphrases can have a structure as noted for FIG. 8A. However, multiple passphrases can have a same common password (common_pw), but different user or devices can have different specific passwords (specific_pw0 to specific_pwn). Passphrases can also have different password ids (pw id0 to pw id_n). A beacon can be transmitted that includes supported ciphers 850-1.

A method 850 can generate a scalar (scalar2c) and an element (element2c) based on a common_pw as described herein or equivalents 850-2. A method 850 can transmit an SAE commit message that includes scalar2c and element2c 850-3. If a corresponding SAE commit message is not received (N from 850-4), a method can end 844. In some embodiments, such an action can include waiting for a predetermined timeout period. If a corresponding SAE commit message is received (Y from 850-4), a method can generate a key PMK_common using at least a scalar (scalar1c) and element (element1c) present in the received SAE commit message 850-5. In some embodiments, PMK_common can be generated with scalar1c, element1c, and at least a portion of scalar2c. In some embodiments, PMK_common can be generated using scalar2c, element2c, scalar1c, and element1c.

An SAE confirm message can be transmitted that indicates extended pw id operations can be supported 850-6. All or a portion of such a message can be encrypted with PMK_common. If a corresponding SAE commit message is not received (N from 850-7), a method can end 844. If a corresponding SAE commit message is received (Y from 850-7), a method can attempt to validate the received SAE confirm message 850-8. Such an action can include using PMK_common to decode a portion of the message and/or executing some other suitable validation operation, including but not limited cryptographic hash functions that include use of PMK_common. If a received SAE confirm message cannot be validated (N from 850-8), a method can end 844. If a received SAE confirm message is validated (Y from 850-8), a method can determine if the SAE confirm message includes an extended pw id 850-9. In some embodiments, such an action can include comparing a value at a predetermined location within the received SAE confirm message to those previously stored (e.g., box 850-0).

Referring to FIG. 8B, if the SAE confirm message does not include an extended pw id (N from 850-9, 846-0), a method can execute a conventional four-way handshake operation with a STA to create a secure connection 850-18. If the SAE confirm message includes an extended pw id (Y from 850-9, 846-1), a method can generate a scalar2s and an element2s 850-10. Such actions can include any of those described herein or equivalents. A second SAE commit message can be transmitted that includes scalar2s and element2s 850-11.

If a corresponding second SAE commit signal is not received (N from 850-12), a method can end 844. If a corresponding second SAE confirm message is received (Y from 850-12), a method generate a key PMK_specific using at least a scalar1s and element1s present in the received SAE confirm message 850-13. In some embodiments, PMK_specific can be generated with scalar1s, element1s, and at least a portion of scalar2s. In some embodiments, PMK_common can be generated using scalar2s, element2s, scalar1s, and element1s.

A method 850 can include transmitting a second SAE confirm message encrypted with PMK_specific 850-14. If a corresponding second SAE confirm message is not received (N from 850-15), a method can end 844. If a corresponding second SAE confirm message is received (Y from 850-15), a method 850 can attempt to validate the received second SAE confirm message 850-16. Such an action can include using PMK_specific to decode a portion of the message and/or executing some other suitable validation operation, including but not limited cryptographic hash functions that include use of PMK_specific. If a received second SAE confirm message cannot be validated (N from 850-16), a method can end 844. If a received second SAE confirm message is validated (Y from 850-16), a method can execute a four-way handshake operation with an AP to generate encryption keys using PMK_specific 850-17. In some embodiments, such an action can include, but is not limited to, using PMK_specific to generate a PTK.

Optionally, a method can include differentiating access to network capabilities based on a specific_pw of an authenticated device 850-18.

In this way, a device can receive scalar and element values corresponding to a common password and generate a first pairwise master key. If received messages indicate extended password capabilities, the device can receive second scalar and element values and generate a second pairwise master key.

Figure 9:
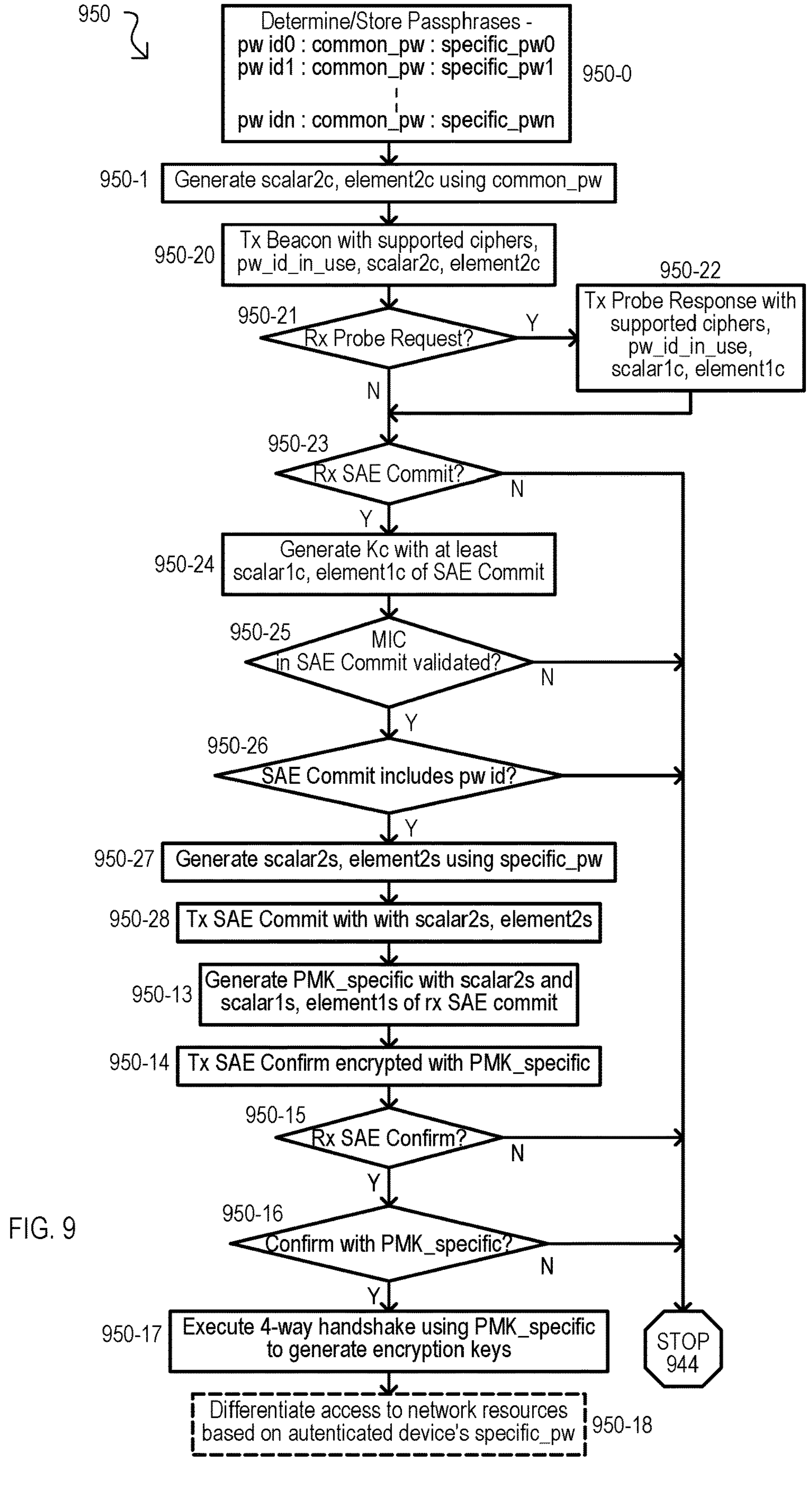
FIG. 9 is a flow diagram of a method executable by a wireless device according to another embodiment.

FIG. 9 is a flow diagram of a method 950 according to another embodiment. In some embodiments, a method 950 can be executed by circuits of an AP. A method 950 can include items like those of FIGS. 8A and 8B, and such like items are referred to by the same reference character but with the leading digit being a "9" instead of an "8".

FIG. 9 can include actions 950-0 and 950-1, which can occur in the same or an equivalent manner to 850-0 and 850-1 shown in FIG. 8A.

A method 950 can include transmitting a beacon that indicates supported ciphers, that extended password id operations are in use, as well as a scalar2c value and element2c value 950-20. Extended password id operations can be indicated by predetermined values in the message. Scalar2c and element2c values can be generated as described herein, or equivalents. If a method receives a probe request (Y from 950-21), a corresponding probe response can be transmitted 950-22. Such a probe response can include the same values as a beacon 950-20. Further, some embodiments may not include a beacon, and only transmit a probe response.

A method 950 can determine if an SAE commit message is received 950-23. If such a commit message is not received (N from 950-23), a method can end 944. If such a commit message is received (Y from 950-23), a method can generate an encryption key Kc. In some embodiments, Kc can be generated as described for 740-32 of FIG. 7A. A method 950 can determine if a MIC received in the SAE commit message can be validated 950-25. Such an action can include using Kc in the MIC check. If the MIC cannot be validated (N from 950-25), a method can end 944.

If the MIC can be validated (Y from 950-25), a method can determine if the SAE commit messages includes an pw id value 950-26. Such an action can determine if pw id corresponds to any values stored (e.g., values passphrases from 950-0). If a valid pw id was not included (N from 950-26), a method can end 944. If a valid pw id was included (Y from 950-26), a method can generate a scalar2s value and an element2s value using a specific_pw 950-27. Such actions can include any of those described herein or equivalents. An SAE commit message can be transmitted that includes scalar2s and element2s 950-28.

A method 950 can proceed with actions 950-13 to 950-17 and 944 in a corresponding, or equivalent fashion as FIG. 8B.

In this way, a device can transmit a FFE corresponding to a common password in a beacon or probe response. If the device receives a pw id value, it can generate a pairwise master key using a specific password in an SAE exchange.

While embodiments can include various systems and methods, embodiments can also include devices of such systems and/or device that execute any of the described methods.

Figure 10:
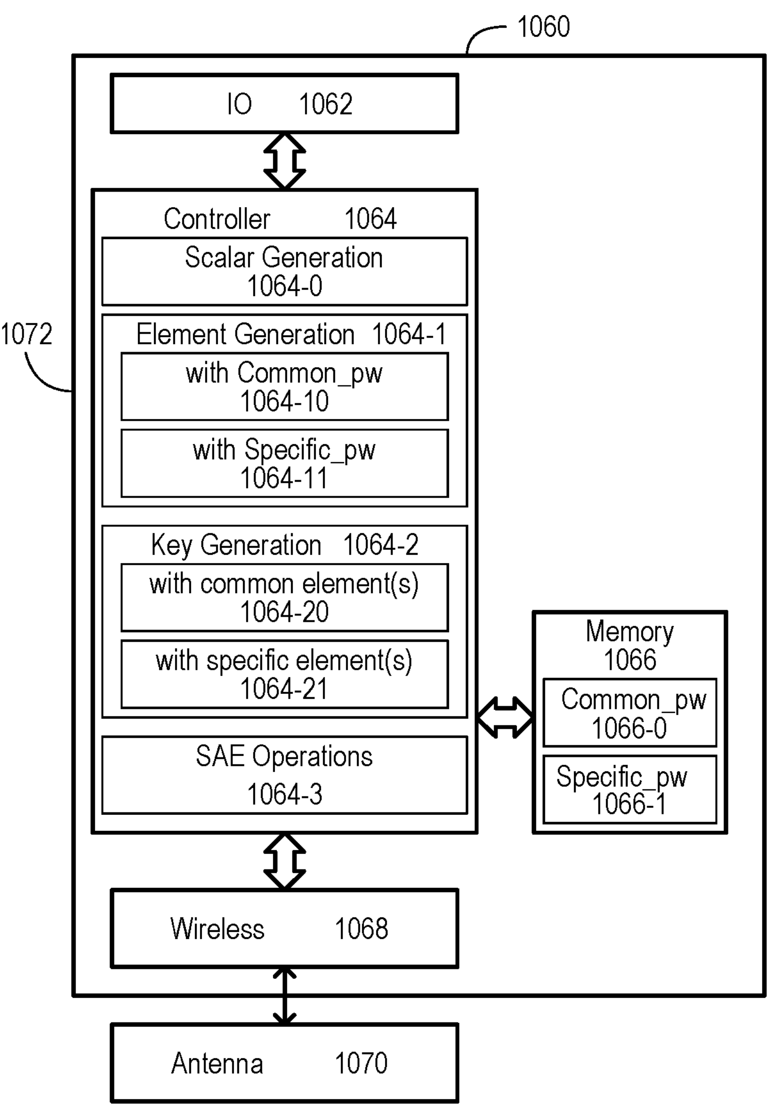
FIG. 10 is a block diagram of a wireless device according to an embodiment.

FIG. 10 is a block diagram of a wireless device 1060 according to an embodiment. A wireless device 1060 can be a device that controls the addition of devices to a wireless network (e.g., an AP) or can be a device that seeks to be added to a wireless network. A device 1060 can include an input/output (IO) circuit 1062, controller circuits 1064, memory circuits 1066, and wireless circuits 1068. IO circuit 1062 can enable a device 1060 to be controlled by external users or systems.

Controller circuits 1064 can include any suitable circuits for executing wireless communications as described herein, and equivalents, including but not limited to one or more processors, custom logic circuits, programmable logic circuits, machine learned/learning systems, or combinations thereof. Controller circuits 1064 can include scalar generation operations 1064-0, element generation operations 1064-1, key generation operations 1064-2 and SAE operations 1064-3. Scalar generation operations 1064-0 can include generating scalars as described herein, including but not limited to, any of scalar1c, scalar2c, scalar1s or scalar2s values.

Element generation operations 1064-1 can include generating FF element values based on a common_pw value 1064-10 and well as based on a specific_pw value 1064-11. Such operations can include any of those described herein or equivalents (including those that generate element1c, element2c, element1s, or element2s). In some embodiments, such an action can include using an agreed upon ECC function.

Key generation operations 1064-2 can include any of those described herein, or equivalents, including but not limited to generating keys based on common_pw 1064-20, including but not limited to Kc and/or PMK_common. Further, key generation can include generating a key from FF elements generated with a specific_pw, including but not limited to PMK_specific 1064-21. Further, generation of keys can include the use of corresponding scalars (scalar1c, scalar2c, scalar1s, scalar2s) or portions thereof. SAE operations 1064-3 can include transmitting commit and confirm messages, as well as processing corresponding commit and confirm messages received from other devices.

Memory circuits 1066 can include any suitable memory circuit types, including volatile memory, nonvolatile memory, and combinations thereof. Memory circuits 1066 can store any suitable data for executing the operations described herein, including instructions executable by controller circuits 1064. Such data can include, but is not limited to, one or more common_pw values 1066-0 and/or one or more specific_pw values 1066-1. According to embodiments, a common_pw can be related to one or more specific_pws. In some embodiments, common_pw and specific_pw values (1066-0/1) can be stored in nonvolatile memory circuits. Wireless circuits 1068 can include circuits compatible with one or more standards, including public and/or private standards. In some embodiments, wireless circuits 1068 compatible with one or more Wi-Fi standards.

In some embodiments, IO circuits 1062, controller circuits 1064 and wireless circuits 1068 can be part of a same integrated circuit substrate 1072. A wireless device 1060 operate in conjunction with an antenna system 1070.

In this way, a wireless device can include circuits for generating FF elements from a common password and one or more related specific passwords. Encryption keys for validating wireless transmissions can then generated from such FF elements.

Figure 11:
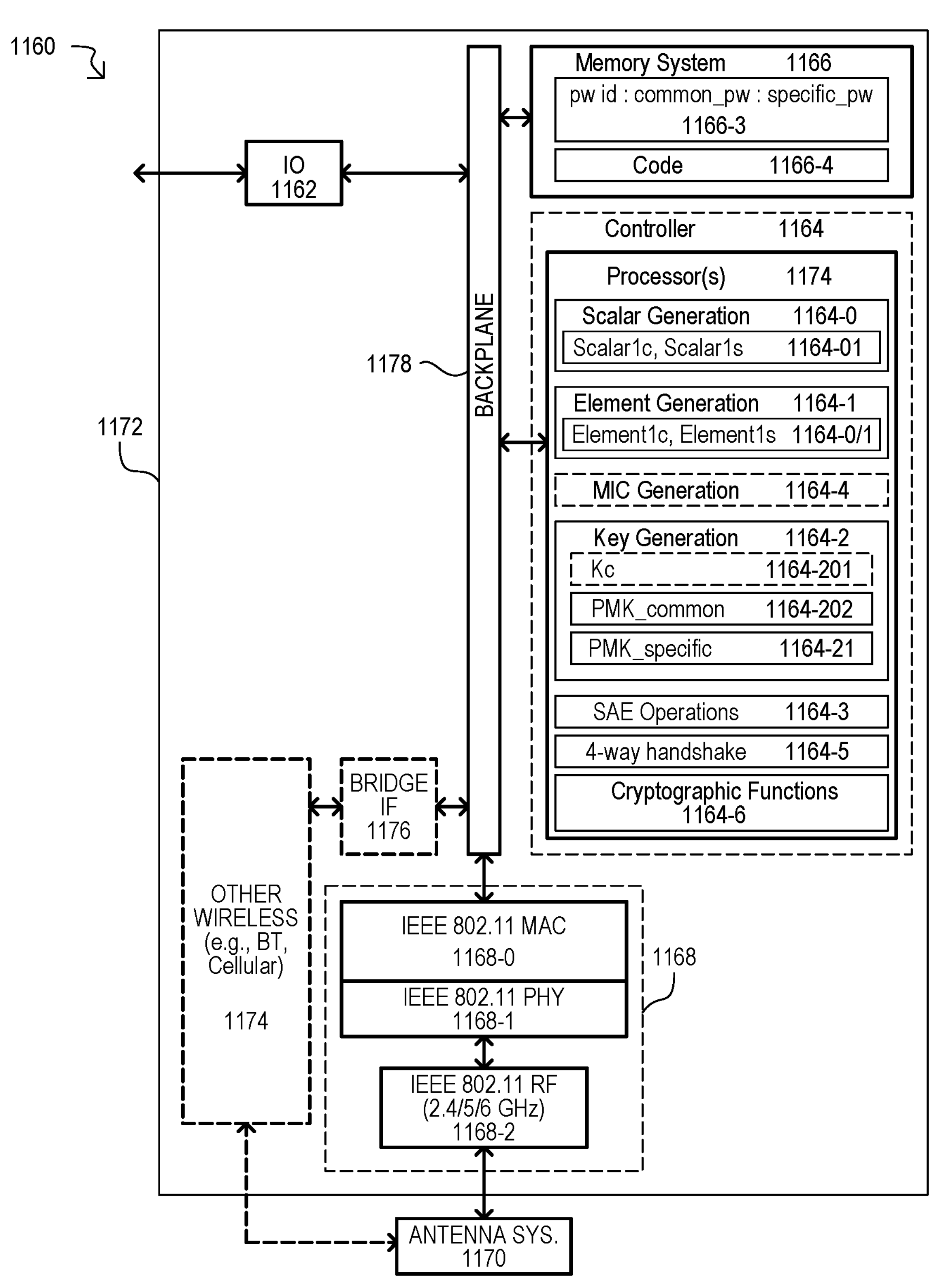
FIG. 11 is a block schematic diagram of a station wireless device according to embodiments.

FIG. 11 shows a device 1160 according to another embodiment. In some embodiments, a device 1160 can be a STA in systems as described herein. A device 1160 can include IO circuits 1162, controller circuits 1164, memory circuits 1166, wireless circuits 1168, and optionally, other wireless circuits 1174 and bridge circuits 1176. Such device portions can be connected to one another over a backplane/bus 1178.

Memory circuits 1166 can include any suitable memory circuits, including secure nonvolatile memory, and optionally, volatile memory. Memory circuits 1138 can store data for enabling the various operations of wireless device 1160, including a passphrase 1166-3 and code 1166-4. A passphrase can include a pw id, common_pw and specific_pw separated by one or more separation characters, as described herein or equivalents. Code 1166-4 can be code (e.g., firmware) executable by processor section 1174 to provide the various processor operations described herein.

Controller section 1164 can include processor circuits 1174. Processor circuits 1174 can execute code 1166-4 to provide various functions for the device 1160. Operations provided by processor circuits 1174 can include, but are not limited to, scalar generation 1164-0, element generation 1164-1, key generation 1164-2, SAE operations 1164-3, four-way handshake operations 1164-5, cryptographic functions 1164-6, and optionally, MIC generation 1164-4.

Scalar operations 1164-0 can occur as described for other embodiments, herein, including the generation of scalars used for the computation of keys based on a common_pw (scalar1c), as well as scalars used for the computation of keys based on a specific_pw (scalar1s) 1164-01. Element operations 1164-1 can occur as described for other embodiments, herein, including the generation of elements based on a common_pw (element1c), as well as elements based on a specific_pw (element1s).

Key generation operations 1164-2 can include operations as described herein, and equivalents. Such operations can include the generation of a PMK_common 1164-202 based on a common_pw, PMK_specific 1164-21 based on a specific_pw. Optionally, key generation operations 1164-2 can include the generation of Kc 1164-201 based on common_pw, as described herein and equivalents. SAE operations 1164-3 and four-way handshake operations 1164-5 can occur as described herein and equivalents. Optionally, MIC generation 1164-4 can include generating a MIC as described herein and equivalents.

Cryptographic functions 1164-6 of processor circuits include the various hash functions and decryption functions needed for the described authentication operations. Further, such cryptographic functions can be used for encryptions with an agreed upon mutual keys following successful authentication and a subsequent four-way handshake.

Wi-Fi circuits 1168 can provide wireless communications compatible with one or more Wi-Fi standards. Wi-Fi circuits 1168 can include MAC layer circuits 1168-0, physical layer (PHY) circuits 1168-1, and RF circuits 1168-2. Such circuits (1168-0, -1, -2) can be compatible with one or more Wi-Fi standards, on any suitable band, including but not limited to the 2.4 GHz, 5 GHZ and/or 6 GHz bands.

IO circuits 1162 can input or output signals that can enable control of a device 1108 from sources external to the device according to any suitable fashion. In some embodiments, IO circuits 1162 can include serial communication circuits, including but not limited to interfaces compatible with a serial digital interface (SDI), universal serial bus (USB), universal asynchronous receiver transmitter (UART), I2C, or I2S.

Bridge interface circuits 1176 can enable communications between Wi-Fi circuits 1168 and other wireless circuits 1174. In some embodiments, such communications can control which wireless circuits (1168 or 1174) can control a shared medium (e.g., 2.4 GHz band).

Other wireless circuits 1174 can be one or more wireless circuits compatible with a standard other than a Wi-Fi standard, including but not limited to, one or more BT standards, one or more IEEE 802.15.4 or related standards and/or one or more cellular network standards.

A device 1160 can operate in conjunction with an antenna system 1170 having one or more antennas compatible with one or more Wi-Fi standards, as well as other standards if another wireless section 1174 is included.

In some embodiments, IO circuits 1162, controller circuits 1164, and Wi-Fi circuits 1168 can be formed with a same integrated circuit substrate 1172.

In this way, a Wi-Fi compatible wireless device can store a passphrase that includes a common password and specific password. In authentication operations, the common and specific passwords can be transformed into FF elements and used to generate passwords for authenticating with another device.

Figure 12:
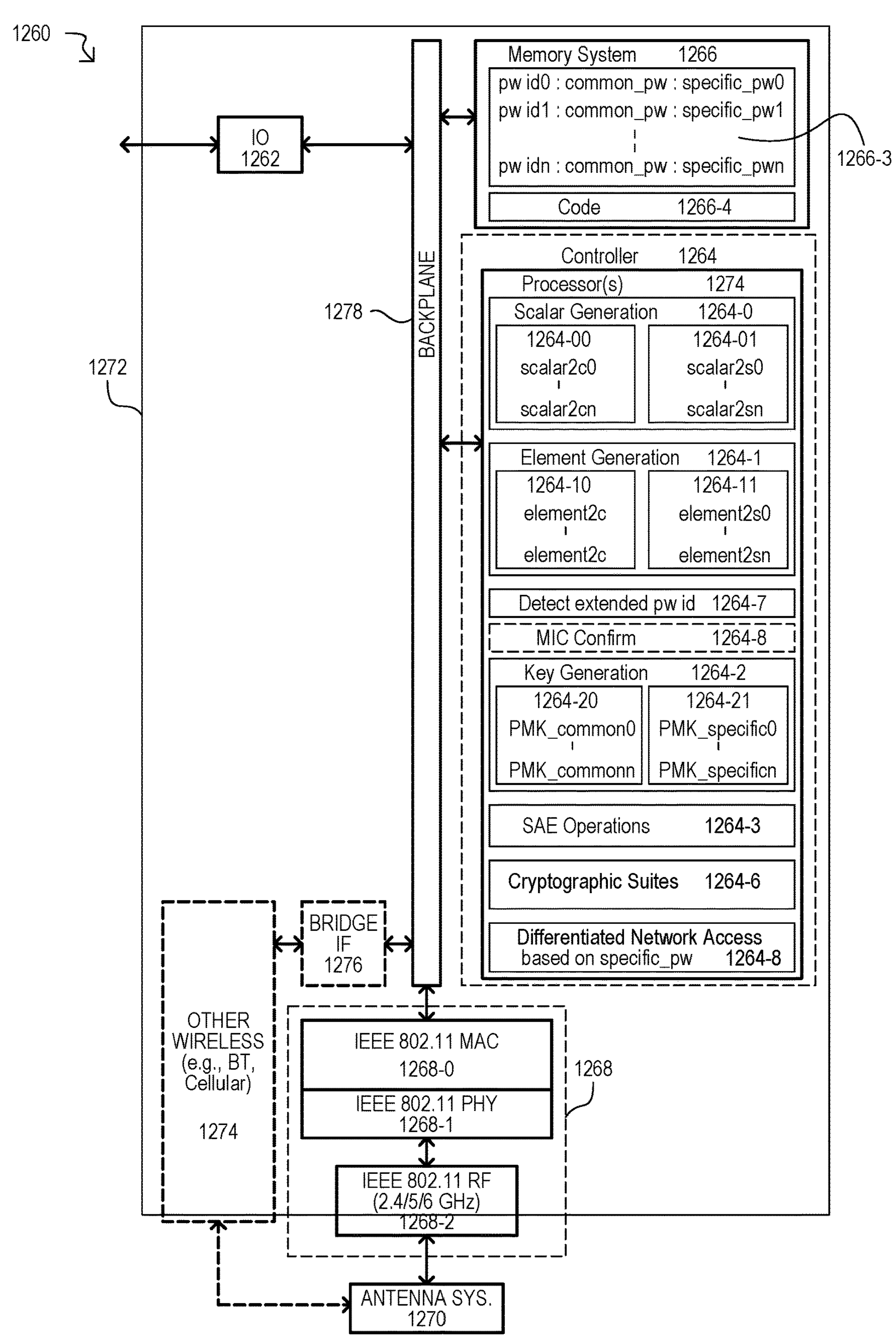
FIG. 12 is a block schematic diagram of an access point wireless device according to embodiments.

FIG. 12 shows a device 1260 according to another embodiment. In some embodiments, a device 1260 can be an AP in systems as described herein. A device 1260 can include items like those of FIG. 11, and such items are referred to by the same reference character but with the leading digit being an "12" instead of a "11".

A device 1260 can differ from that of FIG. 11 in that a memory system 1266 can store multiple passphrases 1266-3, each corresponding to a different device/user. In the embodiment shown, each passphrase can include a password id (pw id0 to pw idn), a same common_pw, and a different specific password (specific_pw0 to specific_pwn). Such values can be used to generate keys as described herein and equivalents.

A device 1260 can further differ from that of FIG. 11 as follows. Processor circuits 1274 can execute scalar generation operations 1264-0 that can generate different scalar values 1264-00 (scalar1c0 to scalar1cn) for use in generating keys based on common_pw, and generate different scalar values 1264-01 (scalar1s0 to scalar1sn) for use in generating keys based on specific_pw0 to specific_pwn, respectively.

Processor circuits 1274 can execute element generation operations 1264-1 that can generate a FF element values 1264-10 for use in generating keys based on a common_pw. In some embodiments, while FF element values 1264-10 can be generated from a same common_pw, such element values may be different for each accessing device. Element values 1264-11 can be generated for the different specific password values (element2s0 to element2sn) for use in generating keys based on specific_pw0 to specific_pwn, respectively.

Processor circuits 1274 can execute key generation operations 1264-2 that can generate PMK_common keys from elements (element2c0 to -2cn) and scalar values (scalar2c0 to -2cn) related to a common_pw. Such operations can also generate PMK_specific keys from elements (element2s0 to -2sn) and scalar values (scalar2s0 to -2sn) related to a specific passwords (specific_pw0 to specific_pwn).

Processor circuits 1274 can execute a detect pw id operation 1264-7. Such an action can examine predetermined fields in received messages that indicate whether a transmitting device (e.g., STA) supports extended password operations. Such a field can include, but is not limited to, a pw id value and/or an encrypted pw id value.

Optionally, processor circuits 1274 can execute a MIC confirmation operation 1264-8 that can generate a key from received values (e.g., element1c, scalar1c), and use such a key to execute a validating hash function to confirm a MIC in a received message. Optionally, processor circuits 1274 can implement differentiated access to network features based on a specific_pw of an authorized device 1264-8.

In this way, a Wi-Fi compatible wireless device can store multiple passphrases each include a common password and different specific password. In authentication operations, the common and specific passwords can be transformed into FF elements and used to generate different passwords for authenticating with another device.

Figure 13:
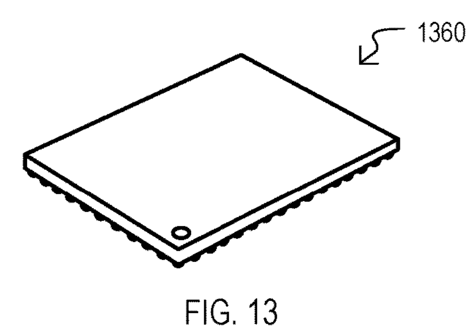
FIG. 13 is a diagram of an integrated circuit device according to an embodiment.

While embodiments can include systems and devices with various interconnected components, embodiments can also include unitary devices having Wi-Fi circuits that can advantageously execute authentication operations based passphrases that may include a common password and different specific passwords. Such unitary devices can be advantageously compact single integrated circuits (i.e., chips). FIG. 13 show one example of a packaged single chip wireless device according to an embodiment. Such a device 1360 can include circuits for authentication operations, as described herein and equivalents. In some embodiments, a device 1360 can include circuits like those shown in any of FIGS. 10-12.

However, it is understood that a device according to embodiments can include any other suitable integrated circuit packaging type, as well as direct bonding of a device chip onto a circuit board or substrate.

Figure 14:
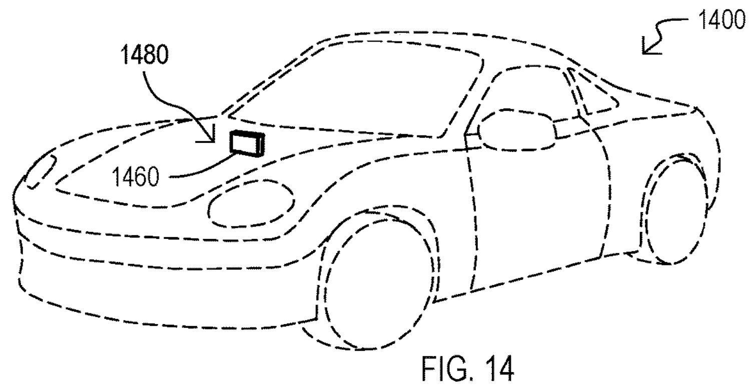
FIG. 14 is a diagram of a vehicle system according to an embodiment.

Embodiments can enjoy application in subsystems of motor vehicles to enable multiple users and/or devices having a same common password and different specific passwords to access an wireless network connected to, or part of a vehicle. FIG. 14 shows a motor vehicle system 1400 according to another embodiment. A motor vehicle system 1480 can include one or more subsystems 1460 (e.g., in-vehicle infotainment system) that can include a wireless device 1460 in the form of any of those described herein, or equivalents.

In this way, vehicles can include wireless systems that can execute extended password id operations, which can rely on keys generated from a common password and specific password of a same passphrase.

Figure 15:
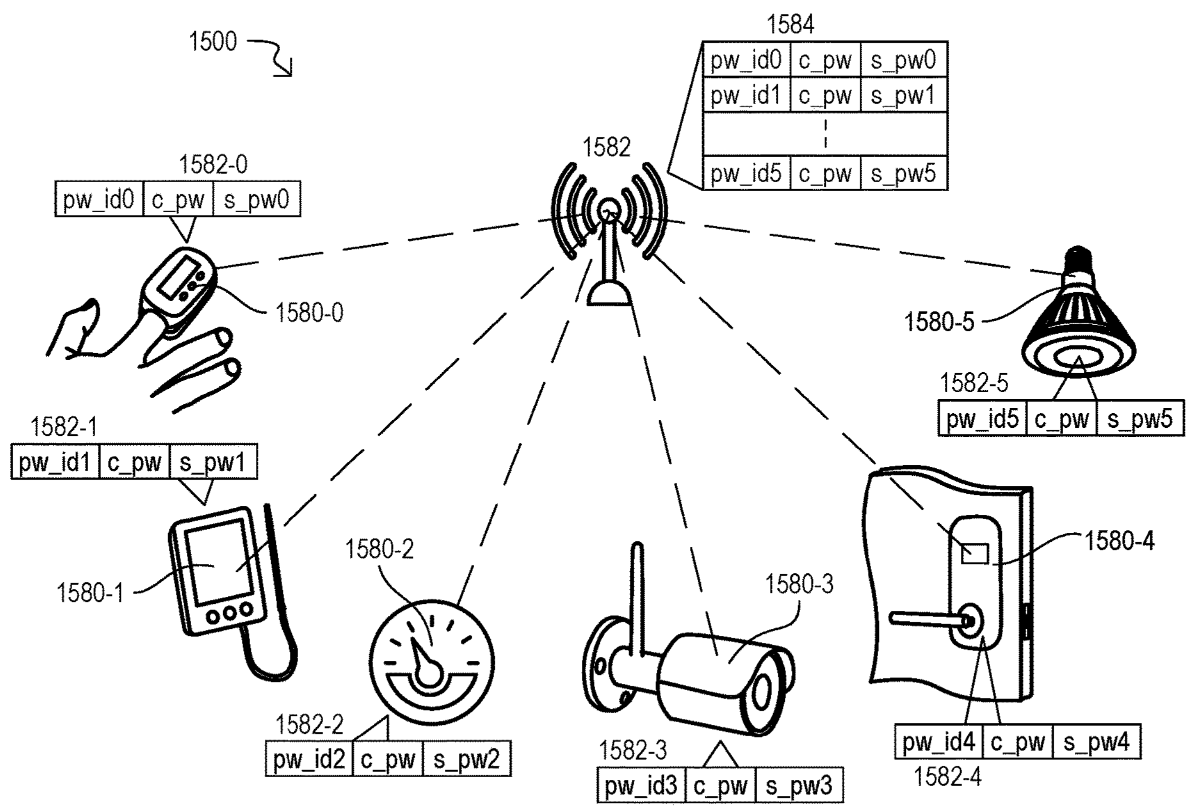
FIG. 15 is a diagram of a system according to an embodiment.

FIG. 15 shows a system 1500 according to a further embodiment. System 1500 can include a controlling wireless device 1582 and a number of other wireless devices 1580-0 to 1580-5. A controlling wireless device 1582 can enable a device to be added to a wireless network (e.g., an AP with configuration abilities) based on stored passphrases 1584.

In the embodiment shown, wireless devices (1580-0 to -5) can be "Internet-of-things" (IoT) type devices, including but not limited to: medical devices 1580-0/1, instrumentation devices 1580-2, security devices 1580-3/4, or lighting devices 1580-5. However, such wireless devices are provided by way of example, and any suitable wireless device can benefit from the flexible, user-friendly, and secure authentication methods as described herein and equivalents. Each wireless device (1580-0 to -5) can be assigned a passphrase (1582-0 to 1582-5) that includes a password id (pwid0 to pwid5), which can be unique, a common_pw (c_pw) that can be the same for the passphrases, and a unique specific_pw (s_pw1 to s_pw5). However specific passwords (s_pw1 to s_pw5) can be generated by users, for ease in use and/or organization of devices (1580-0 to -5). Controlling wireless device 1582 can store such passphrases 1584, and use them to authenticate devices that seek to join a wireless network.

In operation, a wireless device (1580-0 to -5) can seek access to a network by detecting a broadcast message (e.g., beacon) and/or request network information (e.g., transmitting a probe request). In response to such actions, the wireless device (1582-0 to -5) can enter into authentication operations that can include the generation of a common key generated by a common cryptographic function using the common password, and validation operation using such a common key. Authentication can continue by the devices each confirming the other device supports extended password id operations. A specific key can be generated by a common cryptographic function using a specific password, and validation operation performed using such a specific key. Such operations can include any of those described herein, or equivalents. Optionally, AP 1582 can differentiate network access based on specific passwords.

Embodiments can include methods, devices and systems that include, by operation of a first wireless device, storing a first passphrase comprising a common password and a specific password, transforming the common password into a first finite field (FF) element and the specific password into a second FF element. A first key can be generated using a received third scalar value and third FF element. A commit message can be transmitted with a portion encrypted with the first key. In response to receiving a fourth scalar value and a fourth FF element, generating a second key using at least the fourth scalar value and the fourth FF element, and transmitting a second wireless message with a portion encrypted with the second key. In response to validating a received confirmation message using the second key, establishing encryption keys for a wireless connection using at least the second key.

Embodiments can include methods, devices and systems having memory circuits configured to store at least one passphrase comprising a common password and a specific password; controller circuits configured to transform the common password into a first finite field (FF) element, transform the specific password into a second FF element, generate a first key using at least a second scalar value and a second FF element, generate a second key using at least a fourth scalar value and a fourth FF element, and establish encryption keys for a wireless connection using at least the second key. Wireless circuits can be configured to receive and transmit messages according to at least one standard, including receiving messages with the third scalar value, third FF element, fourth scalar value and fourth FF element, and transmitting messages with the first scalar value, first FF element, second scalar value and second FF element.

Embodiments can include methods, devices and systems can include a first wireless device configured to store at least one passphrase comprising a common password and a specific password, transform the common password into a first finite field (FF) element and the specific password into a second FF element, wirelessly transmit the first FF element and a first scalar value to a second wireless device, wirelessly receive a third FF element and a third scalar value from the second wireless device, generate a first key with at least the third scalar value and third FF element, wirelessly transmit the second FF element and a second scalar value to the second wireless device, wirelessly receive a fourth FF element and a fourth scalar value, generate a second key with at least the fourth FF element and fourth scalar value, and in response to validating a confirmation message from the second wireless device with the second key, establishing encryption keys for a wireless connection with the second wireless device using at least the second key.

Methods, devices and systems according to embodiments can include applying a common password as an input to an ECC function to generate a first FF element.

Methods, devices and systems according to embodiments can include establishing encryption keys for a wireless connection using at least a second key based on a specific password by executing a four-way handshake protocol with a second wireless device.

Methods, devices and systems according to embodiments can include a first wireless device being a STA that receives and transmits messages compatible with at least one IEEE 802.11 wireless standard.

Methods, devices and systems according to embodiments can include a third scalar value and a third FF element being received in a beacon message or a probe response message.

Methods, devices and systems according to embodiments can include a third scalar value and a third FF element being received in a commit message of an SAE protocol.

Methods, devices and systems according to embodiments can include a first scalar value and second scalar value are selected from the group of: random numbers and nonces.

Methods, devices and systems according to embodiments can include, by operation of the first wireless device, storing a pw_id corresponding to a common and first specific password in first memory circuits. The pw_id can be encrypted with a first key. A MIC can be generated with at least the first key, the MIC including at least a first scalar value, a first FF element, and the encrypted pw_id.

Methods, devices and systems according to embodiments can include, by operation of a second wireless device, storing in second memory circuits a plurality of passphrases, each comprising the common password and a different specific password. In response to receiving at least a first scalar value and a first FF element from a first wireless device, a first key can be generated using at least the first scalar and first FF element. In response to receiving at least the second scalar value and second FF element from the first wireless device, a second key can be generated using at least the second scalar value and the second FF element.

Methods, devices and systems according to embodiments can include a second wireless device being an access point device compatible with at least one IEEE 802.11 wireless standard that controls access to a wireless network based on the passphrases.

Methods, devices and systems according to embodiments can include controller circuits that can be configured to apply a common password to an ECC function to generate a first FF element.

Methods, devices and systems according to embodiments can include, at least one passphrase that further includes a pw id in addition to a common password and specific password. Controller circuits can be configured to encrypt the pw id with the first key. Wireless circuits can be configured to transmit the encrypted pw id in a wireless message.

Methods, devices and systems according to embodiments can include wireless circuits that are compatible with at least one IEEE 802.11 wireless standard.

Methods, devices and systems according to embodiments can include, a first wireless device configured to execute a SAE operation with the second wireless device that includes wirelessly transmitting the first FF element and scalar value, and wirelessly receiving the third FF element and scalar value.

Methods, devices and systems according to embodiments can include, a first wireless device being a STA seeking to join a wireless network. A second wireless device can be an AP that is configured to store a plurality of passphrases, each passphrase including at least the common password and a different specific password.

Methods, devices and systems according to embodiments can include, a first wireless device is configured to execute a four-way handshake protocol with the second wireless device that includes establishing encryption keys for a wireless connection with the second wireless device.

It should be appreciated that reference throughout this specification to “one embodiment” or “an embodiment” means that a particular feature, structure or characteristic described in connection with the embodiment is included in at least one embodiment of the present invention. Therefore, it is emphasized and should be appreciated that two or more references to “an embodiment” or “one embodiment” or “an alternative embodiment” in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claims require more features than are expressly recited in each claim. Rather, inventive aspects lie in less than all features of a single foregoing disclosed embodiment. Thus, the claims following the detailed description are hereby expressly incorporated into this detailed description, with each claim standing on its own as a separate embodiment of this invention.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method, comprising:

by operation of a first wireless device:

storing in first memory circuits a first passphrase comprising at least a common password and a first specific password, transforming the common password into a first finite field (FF) element and the first specific password into a second FF element, in response to receiving a third scalar value and a third FF element, generating a first key using at least the third scalar value and the third FF element, transmitting a commit wireless message with a portion encrypted with the first key;

in response to receiving a fourth scalar value and a fourth FF element, generating a second key using at least the fourth scalar value and the fourth FF element, and transmitting a second wireless message with a portion encrypted with the second key; and in response to validating a received confirmation message using the second key, establishing encryption keys for a wireless connection using at least the second key.

2. The method of claim 1, wherein transforming the common password includes applying the common password as an input to an elliptic curve cryptographic (ECC) function.

3. The method of claim 1, wherein establishing encryption keys for the wireless connection using at least the second key includes executing a four-way handshake protocol with a second wireless device.

4. The method of claim 1, wherein the first wireless device is a station device that receives and transmits messages compatible with at least one IEEE 802.11 wireless standard.

5. The method of claim 4, wherein the third scalar value and the third FF element are received in a beacon message or probe response message.

6. The method of claim 1, wherein the third scalar value and the third FF element are received in a commit message of a simultaneous authentication of equals (SAE) protocol.

7. The method of claim 1, wherein the first scalar value and second scalar value are selected from the group of: random numbers and nonces.

8. The method of claim 1, further including:

by operation of the first wireless device, storing a password identification value (pw_id) corresponding to the common and first specific password in the first memory circuits, encrypting pw_id with the first key, and generating a message integrity code (MIC) with at least the first key, the MIC including at least the first scalar value, first FF element, and the encrypted pw_id.

9. The method of claim 1, further including:

by operation of a second wireless device, storing in second memory circuits a plurality of passphrases, each comprising the common password and a different specific password, in response to receiving at least the first scalar value and first FF element from the first wireless device, generating the first key using at least the first scalar and first FF element, and in response to receiving at least the second scalar value and second FF element from the first wireless device, generating the second key using at least the second scalar value and the second FF element.

10. The method of claim 9, wherein the second wireless device is an access point device compatible with at least one IEEE 802.11 wireless standard that controls access to a wireless network based on the passphrases.

11. A device, comprising:

memory circuits configured to store at least one passphrase comprising a common password and a specific password;

controller circuits configured to transform the common password into a first finite field (FF) element, transform the specific password into a second FF element, generate a first key using at least a second scalar value and a second FF element, generate a second key using at least a fourth scalar value and a fourth FF element, and establish encryption keys for a wireless connection using at least the second key; and wireless circuits configured to receive and transmit messages according to at least one standard, including receiving messages with the third scalar value, third FF element, fourth scalar value and fourth FF element, and transmitting messages with the first scalar value, first FF element, second scalar value and second FF element.

12. The device of claim 11, wherein the controller circuits are configured to apply the common password to an elliptic curve cryptographic (ECC) function to generate the first FF element.

13. The device of claim 11, wherein:

the at least one passphrase further includes a password identification value (pw id);

the controller circuits are configured to encrypt the pw id with the first key; and the wireless circuits are configured to transmit the encrypted pw id in a wireless message.

14. The device of claim 11, wherein the first scalar value and second scalar values are selected from the group of random numbers and nonces.

15. The device of claim 11, wherein the wireless circuits are compatible with at least one IEEE 802.11 wireless standard.

16. A system, comprising:

a first wireless device configured to store at least one passphrase comprising a common password and a specific password, transform the common password into a first finite field (FF) element and the specific password into a second FF element, wirelessly transmit the first FF element and a first scalar value to a second wireless device, wirelessly receive a third FF element and a third scalar value from the second wireless device, generate a first key with at least the third scalar value and third FF element, wirelessly transmit the second FF element and a second scalar value to the second wireless device, wirelessly receive a fourth FF element and a fourth scalar value, generate a second key with at least the fourth FF element and fourth scalar value, and in response to validating a confirmation message from the second wireless device with the second key, establishing encryption keys for a wireless connection with the second wireless device using at least the second key.

17. The system of claim 16, wherein transforming the common password includes generating a point on the FF by application of the common password to an elliptic curve cryptographic (ECC) function.

18. The system of claim 16, wherein:

the first wireless device is configured to execute a simultaneous authentication of equals (SAE) operation with the second wireless device that includes wirelessly transmitting the first FF element and scalar value, and wirelessly receiving the third FF element and scalar value.

19. The system of claim 16, wherein:

the first wireless device is station device seeking to join a wireless network; and the second wireless device is an access point device of the wireless network that is configured to store a plurality of passphrases, each passphrase including at least the common password and a different specific password.

20. The system of claim 16, wherein the first wireless device is configured to execute a four-way handshake protocol with the second wireless device that includes establishing encryption keys for the wireless connection.

* * * * *